US007328655B2

(12) United States Patent
Baptista

(10) Patent No.: US 7,328,655 B2
(45) Date of Patent: Feb. 12, 2008

(54) JUICE EXTRACTOR WITH DRIVE AND RETURN CAMS FOR EXTRACTOR CUP MOVEMENT

(75) Inventor: Luiz Fernando da Cruz Baptista, Araraquara (BR)

(73) Assignee: FMC Technologies, Inc., Chicago, IL (US)

( * ) Notice: Subject to any disclaimer, the term of this patent is extended or adjusted under 35 U.S.C. 154(b) by 542 days.

(21) Appl. No.: 10/921,069

(22) Filed: Aug. 18, 2004

(65) Prior Publication Data

US 2006/0037497 A1  Feb. 23, 2006

(51) Int. Cl.
*B30B 9/04* (2006.01)
*A23N 1/00* (2006.01)

(52) U.S. Cl. ............. 100/213; 100/37; 100/110; 100/131; 100/282; 99/495

(58) Field of Classification Search ............. 100/37, 100/104, 107, 108, 110, 131, 134, 213, 282, 100/291; 99/495, 509; 74/10.29, 10.6, 53, 74/54, 55, 122
See application file for complete search history.

(56) References Cited

U.S. PATENT DOCUMENTS

| | | | |
|---|---|---|---|
| 2,300,494 A | 11/1942 | Fothergill | 146/3 |
| 2,649,730 A | 8/1953 | Hait | 100/37 |
| 2,780,988 A | 2/1957 | Belk et al. | 100/37 |
| 3,040,864 A | 6/1962 | Belk | 198/25 |
| 3,086,455 A | 4/1963 | Belk | 100/131 |
| 3,123,114 A | 3/1964 | Andrews et al. | 146/3 |
| 3,367,473 A | 2/1968 | Kingsbury | 198/30 |
| 3,499,519 A | 3/1970 | Belk et al. | 198/30 |
| 3,717,084 A | 2/1973 | Robbins et al. | 146/3 R |
| 3,736,865 A | 6/1973 | Hait | 100/98 R |
| 3,960,456 A | 6/1976 | Norris | 403/27 |
| 4,132,358 A | 1/1979 | Keely | 239/204 |
| 4,134,699 A | 1/1979 | Schafer et al. | 403/13 |
| 4,154,163 A | 5/1979 | Niemann | 100/98 R |
| 4,212,088 A | 7/1980 | Goettl et al. | 4/490 |
| 4,300,449 A | 11/1981 | Segredo | 100/98 R |
| 4,309,943 A | 1/1982 | Larsen et al. | 99/509 |
| 4,309,944 A | 1/1982 | Frost, Jr. et al. | 100/104 |
| 4,343,393 A | 8/1982 | Larsen | 198/533 |
| 4,376,409 A | 3/1983 | Belk | 99/509 |
| 4,391,185 A | 7/1983 | Stanley | 99/489 |
| 4,700,620 A | 10/1987 | Cross | 99/510 |
| 4,705,055 A | 11/1987 | Rohm et al. | 134/57 R |
| 4,885,182 A | 12/1989 | Kolodesh et al. | 426/482 |
| 4,905,586 A | 3/1990 | Anderson et al. | 99/510 |

(Continued)

OTHER PUBLICATIONS

"*The FMC Whole Citrus Juice Extractor*," American Society of Mechanical Engineers, Mar. 24, 1983, 6 pages.

(Continued)

*Primary Examiner*—Jimmy T. Nguyen
(74) *Attorney, Agent, or Firm*—Allen, Dyer, Doppelt, Milbrath & Gilchrist, P.A.

(57) ABSTRACT

A juice extractor includes at least one pair of extractor cups being relatively moveable for compressing fruit therebetween. A drive mechanism engages at least one of the extractor cups and includes a drive cam that drives the extractor cup into engagement with the other extractor cup. The drive mechanism includes a return cam for disengaging the extractor cup from the other extractor cup.

19 Claims, 33 Drawing Sheets

U.S. PATENT DOCUMENTS

| | | | |
|---|---|---|---|
| 4,922,813 A | 5/1990 | Compri | 99/510 |
| 4,951,563 A | 8/1990 | Warren et al. | 100/111 |
| 5,017,912 A | 5/1991 | Willis | 340/679 |
| 5,070,778 A | 12/1991 | Cross et al. | 99/510 |
| 5,097,757 A | 3/1992 | Antonio | 99/510 |
| 5,199,348 A | 4/1993 | Cimenti | 99/510 |
| 5,339,729 A | 8/1994 | Anderson | 99/509 |
| 5,386,765 A | 2/1995 | Olusczak et al. | 99/486 |
| 5,480,252 A | 1/1996 | Poscich et al. | 403/371 |
| 5,483,870 A | 1/1996 | Anderson et al. | 99/510 |
| 5,657,927 A | 8/1997 | Bushman et al. | 239/240 |
| 5,802,964 A | 9/1998 | Mendes | 99/509 |
| 5,902,066 A | 5/1999 | Griffen et al. | 403/374.3 |
| 5,970,861 A | 10/1999 | Suter et al. | 100/37 |
| 5,992,311 A | 11/1999 | Suter et al. | 100/37 |
| 5,996,485 A | 12/1999 | Suter et al. | 100/37 |
| 6,234,071 B1 | 5/2001 | Catarain Arregui | 99/504 |
| 6,247,397 B1 | 6/2001 | Diotalevi | 100/71 |
| 6,289,800 B1 | 9/2001 | Moody | 100/118 |
| 6,375,383 B1 | 4/2002 | Ostling et al. | 403/374.3 |
| 6,568,319 B2 | 5/2003 | Schrader et al. | 100/108 |

OTHER PUBLICATIONS

Delavan Spray Technologies, Website Publication, Type EF Spray Nozzles, Aug. 17, 2004, 4 pages.

Ringfeder Keyless Shaft/Hub Connections, Catalog W-300-2, Ringfeder Corporation, Nov. 2001, pp. 1-44.

JUICE EXTRACTOR WITH DRIVE AND RETURN CAMS FOR EXTRACTOR CUP MOVEMENT

FIELD OF THE INVENTION

The present invention relates to the field of juice extractors, and more particularly, this invention relates to juice extractors with moveable extractor cups.

BACKGROUND OF THE INVENTION

In a whole fruit juice extractor such as disclosed in commonly assigned U.S. Pat. Nos. 5,970,861; 5,992,311; 5,996,485; and 6,568,319, the disclosures which are hereby incorporated by reference in their entirety, the motion of the extractor cups and the orifice tube received within the strainer tube are each controlled by mechanical cams. Although the motions are separate, they are synchronized by having the cams located on a single camshaft. In this type of juice extractor, a drive cam (or cup cam) engages cam followers located on a cup support member, i.e., a cup beam. The cup beam cam followers are held in contact with the cams through the use of springs. Current machines include both mechanical springs and air springs. The mechanical springs are used as a safety mechanism to maintain the cup beam elevated or separated from non-moveable extractor cups if the air pressure fails.

There are a number of problems associated with this current design. As the speed of the juice extractor has increased over years of development, it has become necessary to increase the spring force necessary to hold the cam followers tightly to the drive cam. Mechanical springs, of course, were eventually replaced by air springs, and higher air pressure was necessary to prevent "knocking" of the cams corresponding to the separation of the cam from its follower. This additional force imports additional stresses on all members of the cam drive mechanism, causing premature failure of shafts and gears. In addition, the mechanical and air springs both require frequent replacement because of this increased force.

SUMMARY OF THE INVENTION

It is therefore an object of the present invention to provide a juice extractor that overcomes the disadvantages of prior art juice extractors using only mechanical springs and air springs for returning the cup beam or other cup support member as explained above.

These and other objects, features and advantages in accordance with the present invention are provided by the use of a drive cam and a return cam, which maintains the cam followers to the cams and reciprocates the cup beam during the juice extractor cycle. The return cam is typically formed as a mathematic conjugate of the drive cam, i.e., the cup cam.

In accordance with the present invention, a juice extractor includes at least one pair of extractor cups that are relatively moveable for compressing fruit therebetween. A drive mechanism engages at least one of the extractor cups and drives the extractor cup into engagement with the other extractor cup. The drive mechanism comprises a drive cam for driving and engaging the extractor cup and a return cam for disengaging and returning the extractor cup. Preferably, the return cam is formed as a mathematic conjugate of the drive cam. The moveable extractor cups could be positioned on a moveable cup beam or other moveable cup support member. The drive and return cams would engage this cup beam or other cup support member.

In one aspect of the present invention, the juice extractor is formed as a plurality of pairs of extractor cups that are ganged together. The drive cam and return cam can be formed integral as two cam surfaces on a single body or each formed as a single cam body. One camshaft preferably supports both the drive cam and return cam. A cam follower train can be operatively connected to the return cam for disengaging the extractor cup. The extractor cups can be arranged in vertical, opposed relationship forming upper and lower extractor cups, or can be arranged as horizontally arranged extractor cups. Other configurations can also be used as suggested by those skilled in the art.

In yet another aspect of the present invention, a plurality of extractor cups are fixed within an extractor frame, such as on a cup bridge, which can be integrated with a juice manifold. A drive gear can be mounted to an end of the camshaft and the drive mechanism engages the drive gear, which is held within a gearbox.

In this type of extractor, a strainer tube is mounted to receive juice and pulp of fruit. An orifice tube is moveable within the strainer tube. The drive mechanism engages the orifice tube for reciprocating the orifice tube within the strainer tube. The drive mechanism typically includes an orifice beam drive cam mounted on the camshaft and a drive linkage engaging the orifice beam and orifice tube drive cam.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention provides many advantages over prior art juice extractors, such as disclosed in commonly assigned U.S. Pat. Nos. 2,649,730; 2,780,988; 3,717,084; 3,736,865; 4,300,449; 4,309,943; 4,309,944; 4,376,409; 4,700,620; 4,905,586; 4,922,813; 5,339,729; 5,483,870;

5,970,861; 5,992,311; 5,996,485; and 6,568,319, the disclosures which are hereby incorporated by reference in their entirety.

Figure 1:
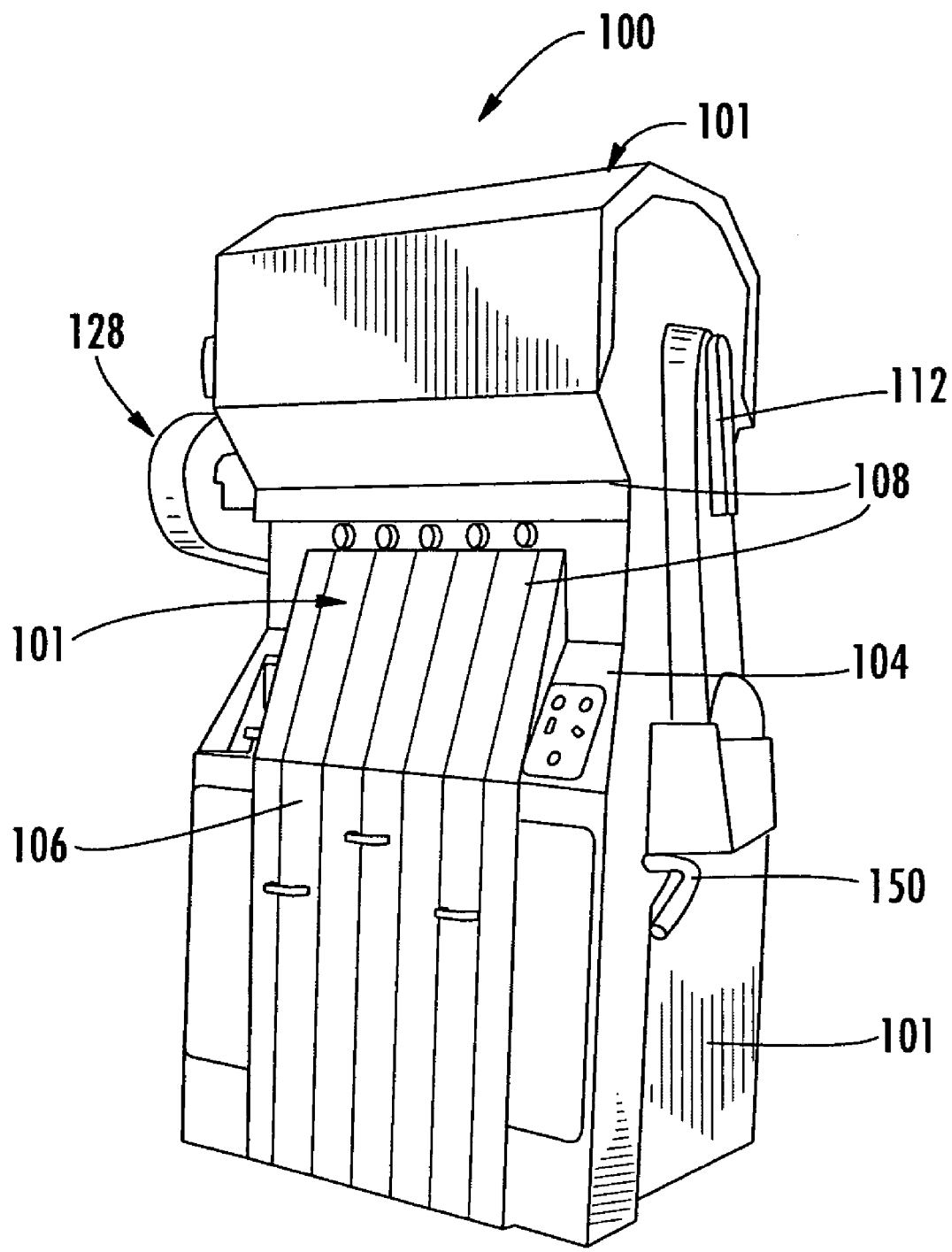
FIG. 1 is a rear perspective view of the juice extractor of the present invention and showing in detail the integral electrical panels.

The present invention includes a new exterior design of the juice extractor, including the exterior outer cover over the extractor frame. The enhanced design includes integrated electrical panels and ribbed outer covers as shown in FIG. 1 and explained in greater detail below. The overall juice extractor design has a slope formed by the outer covers on the extractor frame columns. The present invention also provides a fruit guide assembly including a hollow fruit guide body forming a multi-lane feeder table, also known as a feed hopper, which receives fruit from the feed belt adjacent the extractor line and delivers fruit to a multi-position fruit feeder. The present invention facilitates faster changing of the fruit guide body forming a feeder table, a feed hopper, and eliminates the requirement to remove the vibrator with the feeder table. In the present invention, the fruit guide body bolts to a separate support frame and is easily removable. The vibrator can be removable from the top as an additional service and safety feature. The present invention also eliminates the deadhead previously used with a feeder table.

A multi-position fruit feeder of the present invention uses a proximity switch to detect movement of a load sensitive coupler that incorporates a shear pin. If the shear pin breaks, the load sensitive coupler no longer rotates and the proximity sensor detects this change. This is advantageous over other prior art juice extractors, which continued running when foreign material jammed the fruit feeder, breaking the shear pin. The proximity sensor can be attached to a timer. When the juice extractor is in operation, the sensor detects movement and produces respective ON/OFF pulses. If, after a predetermined period of time, the pulses are no longer detected, for example, when the shear pin is broken, the juice extractor will automatically shut down.

The juice extractor of the present invention also advantageously incorporates a return cam, typically formed as a mathematical conjugate of the extractor cup drive cam to hold the cam followers to the cam and lift the cup support member, i.e., cup beam, during the juice extraction cycle. A counterweight can be mounted to the main drive gear located within the gearbox, or mounted on the camshaft that supports the drive cam and return cam. The counterweight provides balance to the machine during extractor operation.

The juice extractor of the present invention also has inner side panels that define a medial product material area, i.e., a juice and peel area, where the fixed and moveable extractor cups are located, and opposing drive mechanism cavities located between the inner side panels and outer covers of the extractor frame. Peel, of course, includes pulp, seeds, membranes, and core materials. Drive linkages such as a pull-rod assembly, are positioned in each drive mechanism cavity and operatively connect the orifice beam with the orifice beam drive cam mounted on the camshaft. A tapered water spray nozzle of the present invention can be mounted flush on the inner side panels to spray cleaning fluid to aid in cleaning. To enhance cleaning of the juice extractor, the present invention includes a cup bridge formed integral with the juice manifold. Juice piping extends from the juice outlet at the side and exit through the side of the juice extractor, thus eliminating a current piping arrangement where "bullhorn" pipes extend out the front or rear and allow debris build-up. The integrated cup bridge and juice manifold typically has juice outlets at the side juxtaposed to the inner wall panels, which allows the juice piping to exit the sides.

The strainer tube is preferably bottom loaded, and includes an improved sealing assembly between the juice manifold and strainer tube. The camshafts are now preferably held by friction on the camshaft through an appropriate cup-drive, shaft-coupler frictionally securing the camshaft in the cam hub. Alignment of the cams can be arranged by positioning an alignment rod through holes placed in the cams during assembly.

The integrated cup bridge and juice manifold includes a number of pressure actuated spray nozzles, i.e., also referred to as pop-up nozzles, mounted on the integrated cup bridge and juice manifold (FIGS. 28-45). These pop-up nozzles can be used for both oil recovery and cleaning. In the present invention, the ends of the orifice beam extend through each inner wall or "side" panel into the drive mechanism cavity where the orifice beam drive mechanism is located. This penetration through the inner wall panels is protected by a moving "window" between the ends of the orifice beam and the side wall panel and formed as a preferred labyrinth seal.

It is clear that the present invention provides numerous advantages over the prior art juice extractors as will be explained in greater detail below with reference to the accompanying drawings.

For purposes of facilitating operation of the juice extractor of the present invention, a general description of the overall juice extraction process from fruit unloading to final processing and waste handling is described with reference to FIGS. 2 and 3. FIG. 4 is an environmental, partial isometric and sectional view of a portion of a single juice extractor unit, which would be positioned in a respective juice extractor machine 40 shows in FIG. 3 and forming respective juice extractor positions where fruit is compressed and juice extracted. The description will proceed by first describing an overall flow of citrus fruit, followed by an explanation of various component parts of a juice extractor unit relative to the overall juice extractor machine, thus giving a general working background of juice extractor principles used in the present invention.

Figure 2:
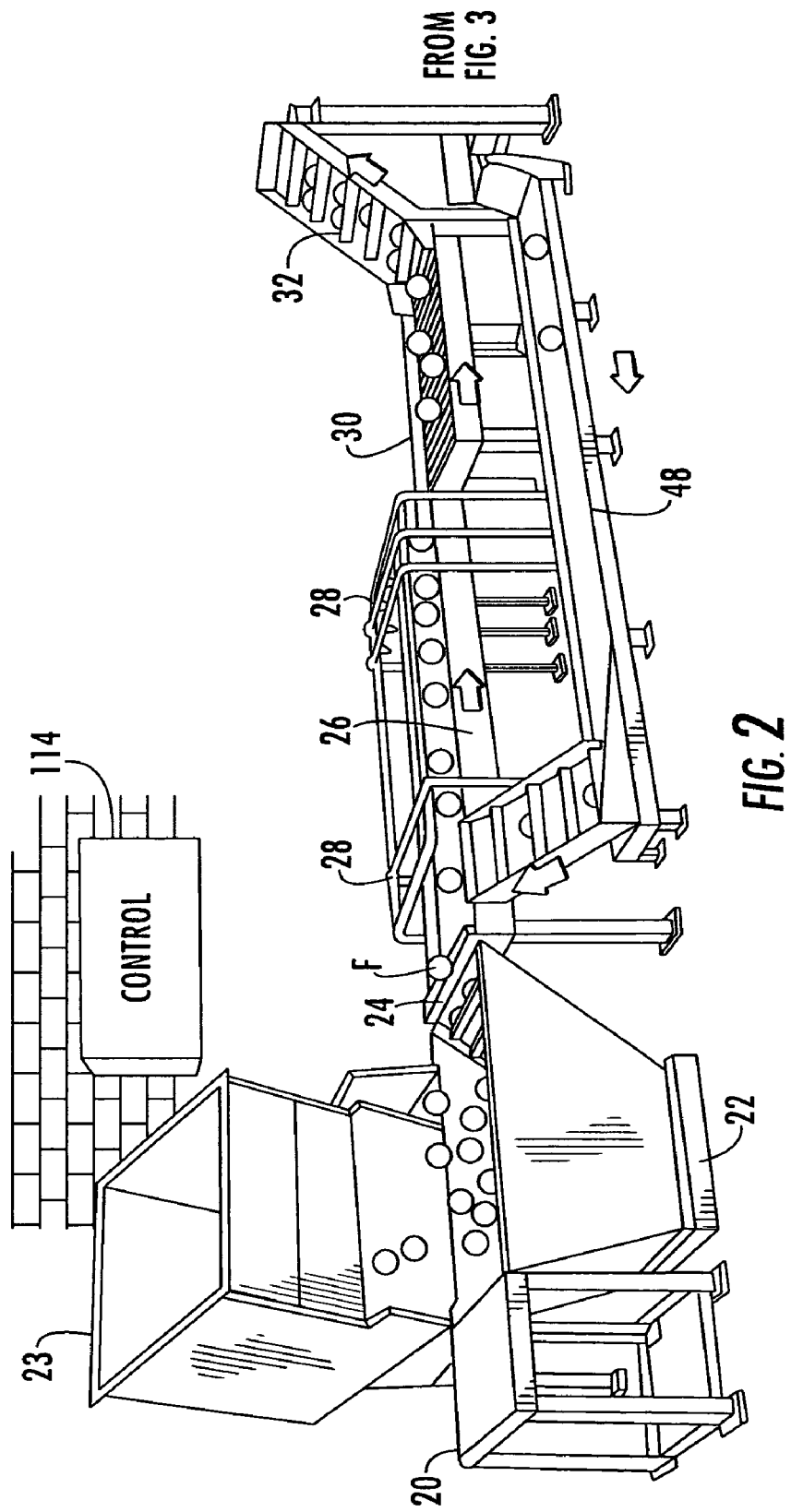
FIGS. 2 and 3 are overall schematic, perspective views of a juice extraction process, showing three juice extractors in FIG. 3, each having five individual juice extractor positions defined by juice extractor units, each comprising a moveable and a fixed extractor cup, a strainer tube, extractor cup, and an orifice tube that is reciprocated within each strainer tube.

As shown in FIG. 2, fruit F can be unloaded by manual, hydraulic, or truck unloading. For example, fruit can be unloaded manually by workers handling many field boxes or cartons, which can be set on a dump ledge 20 for unloading into a hopper 22. Additionally, citrus fruit could be dumped into the hopper 22 by means of an automatic hydraulic dump 23. A large load carrying citrus fruit F, such as oranges, could also arrive by truck, which would dump the fruit into the hopper 22, which includes a vertical conveyor belt 24 that carries fruit F on the necessary conveyors to a brush washer 26. Typically, the conveyor belt 24 has about three inch cleats to elevate fruit to the brush washer 26, as known to those skilled in the art. As the fruit is unloaded, the fruit enters a washer and passes under spray nozzles 28, where fruit cleaners can be applied.

The fruit, as it is washed, passes over a series of brushes in the brush washer 26, where the fruit is gently scrubbed to remove field oils, soil, mold and dust. The brush washer 26 discharges the fruit onto a roller grader 30 where workers can easily select the fruit. Typically, the roller grader 30 is formed such that workers can stand on either side and remove any broken pieces, leaves and other undesirable materials from the flow of fruit supply. It is at this point that some foreign material can still pass through the roller grader. Foreign material, such as milkweed pods, is one example that workers often miss. These milkweed pods are indigenous to citrus growing areas and can cause problems during the juice extraction process. The juice extractor is preferably designed to shut down when the orifice tube becomes lodged within the strainer tube, such as by foreign material, and it allows the juice extractor to shut down operation if a milkweed pod or other similar foreign material becomes stuck in the orifice tube.

Figure 3:
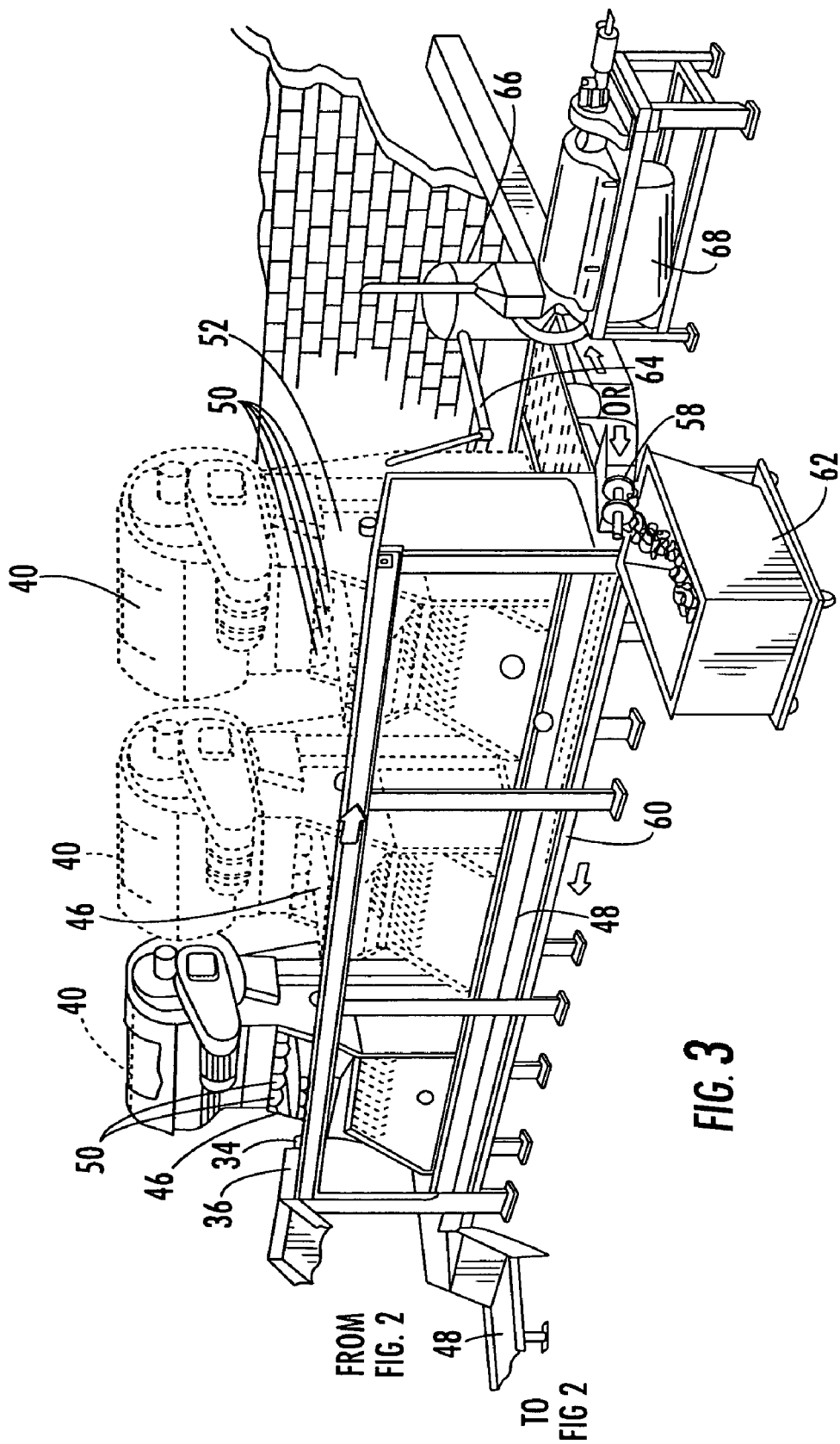
Figure 4:
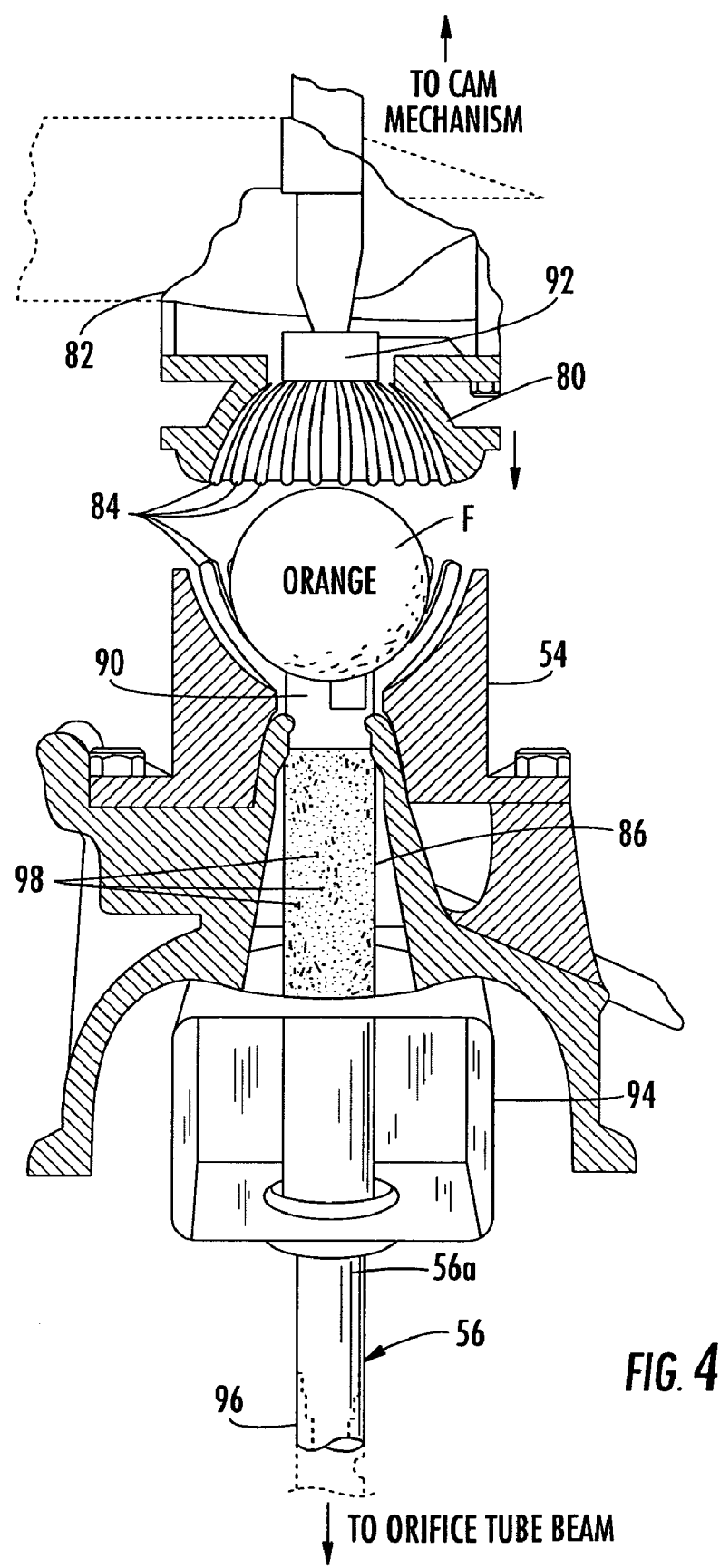
FIG. 4 is a partial perspective and fragmentary view of a portion of a juice extractor unit showing a moveable and a fixed extractor cup, a strainer tube, an orifice tube received within the strainer tube, a cup bridge, and a juice manifold.

The fruit discharges from the roller grader into a cleated belt conveyor 32 that elevates the fruit typically by three inch cleats to the tilted feed belt conveyor 34, as shown in FIG. 3. If two or more juice extractors are placed in tandem as illustrated, a sizing roller 36 provides a single, continuously rotating roller on the tilted feed belt conveyor 34 to separate the fruit into sizes equivalent to the size range of the moveable and fixed extractor cups to ensure maximum yield and quality. For example, as illustrated with the three juice extractors 40, one juice extractor can be used for one range of fruit size, and the other two juice extractors can be used for respective two other ranges of fruit sizes.

As shown in FIG. 3, each juice extractor 40 includes individual juice extractor units 50 (illustrated as five units) that are ganged together in a common extractor frame 52 forming a juice extractor machine 40. The juice extractor unit 50 defines respective juice extractor positions where an individual fruit is received on a fixed extractor cup and compressed or squeezed by a respective moveable extractor cup. The fixed and moveable extractor cups can be horizontally aligned or aligned vertically as explained with reference to the drawings. With vertically aligned extractor cups as illustrated, the fixed extractor cup is typically a lower extractor cup and the moveable extractor cup is typically an upper extractor cup.

The fruit is moved to the feed hoppers 46, i.e., multi-lane feeder table 46 of the juice extractors 40 by a feed belt conveyor 34 that is designed at an angle of about 18° with the low side adjacent to the feeder table 46. The feeder table 46 is formed as a fruit guide assembly that guides fruit from the fruit conveyor to a multi-position fruit feeder as will be explained in detail below. Any fruit that passes by the feeder table is recirculated through a fruit handling system by a return fruit conveyor 48. This fruit could be transferred back to the fruit handling system prior to washing.

The fruit enters the juice extractor feed table 46 and is fed into the fixed, e.g., lower extractor cup 54 by fruit flipper fingers (not shown) operable as part of the multi-position fruit feeder. As will be explained later in detail, the fruit is separated into three primary product streams, a pulpy juice, the peel, and the fruit material that enters an orifice tube 56 (FIG. 4). The waste peel is directed onto a peel screw 58 located under the juice extractor platform 60 and is discharged into a discharge hopper 62 or other waste disposal container, or it can be conveyed through an exterior wall to a truck or trailer, or to further processing.

Typically, the juice extractors 40 are supported on an elevated platform 60 not only to provide support for the juice extractors, but also to provide access for mechanical operation and maintenance. The juice from the various juice extractors 40 enters a stainless steel discharge header 64 extending from each juice extractor and is gravity fed into a surge tank 66 that is designed to maintain a constant flow of juice, preferably to an optional finisher 68. The finisher further removes pulp from the juice by using stainless steel screens with small perforations. A finisher 68 typically is used when a number of juice extractors are placed in tandem, as illustrated.

The juice can be pumped from the surge tank 66 or finisher 68. The juice extraction process shown in FIGS. 2 and 3 is illustrative of a small juice extraction facility. Larger juice extraction facilities are similar in process, but are larger in scale and may include additional equipment known to those skilled in the art. Additional equipment (not shown) may include bucket elevators for lifting and conveying fruit; fruit storage bins for temporary storage of unloaded fruit; sizing equipment for sorting fruit based on size; byproduct recovery systems such as pulpwash systems, and oil recovery systems; feedmills for drying of peel waste; and pasteurizers and evaporators for the processing of juice. These and other equipment are known to those skilled in the art.

Referring to FIG. 4, a portion of a basic juice extractor unit 50 defining a juice extracting position of a juice extractor is illustrated. A moveable extractor cup 80 is mounted on a common cross bar, i.e., a cup support member, also referred to as the cup beam 82 in the illustrated embodiment. The cup beam 82 interconnects other moveable extractor cups as shown in FIG. 3. The cup beam 82 reciprocates by a cam drive (not shown) contained in an upper portion of a juice extractor in this non-limiting embodiment. The fixed extractor cups 54, e.g., lower extractor cups in the illustrated embodiment, are rigidly positioned relative to the extractor frame 52 and mounted on a cup bridge 57. The moveable and fixed extractor cups 80,54 are formed as interdigitated extractor cups that have fingers 84 that intermesh together when the moveable extractor cup 80 engages fixed extractor cup 54.

The moveable and fixed extractor cups 80,54 and their associated components, such as the prefinisher strainer tube 86, the orifice tube 56, and associated cup bridge 57, form one juice extractor unit 50. As illustrated in FIG. 3, a number of juice extractor units are ganged together in one juice extractor machine 40 to increase production. The illustrated juice extractor machine 40 includes five juice extractor units 50 positioned at respective juice extracting positions. The fruit feeder, which will be explained in greater detail below, also can work as a cam-operated device, and includes feeding fingers (not shown in this figure), which deposit a single fruit in the fixed extractor cup 54, such as by tossing the fruit into the extractor cup after receiving the fruit from the feeder table formed as a fruit guide assembly.

The cam-operated drive system in the upper part of the juice extractor forces the moveable extractor cup 80 into the fixed extractor cup and as this occurs, the fruit F is pressed against a circular cutter 90 located at the top of the prefinishing strainer tube 86. This cutter 90 cuts a plug in the bottom of the fruit to allow the internal portions of the fruit access to the strainer tube 86. Another cutter 92 also cuts a plug in the top of the fruit to permit separation of the peel from the internal portions of the fruit, such as the pulp. As the fingers 84 of the extractor cups 54,80 interdigitate or mesh together, the inner portion of the fruit, such as the pulpy juice, is forced down into the strainer tube 86 contained within the juice manifold 94. The peel surfaces do not contact the juice and any contamination by the extractives in the peel is minimized. The peel falls away outside the juice manifold 94 and can be collected by the peel screw conveyor 58 under the extractor platform 60 and discharged into the hopper 62 or other waste disposal container and conveyed through an exterior wall to a truck or trailer or to further processing.

The continuing stroke of the moveable extractor cup 80 and the presence of a restrictor, for example, in the form of blockages, force the juice-bearing portion of the fruit through the perforated wall of the strainer tube. This perforated wall is formed by small strainer tube holes 98, which allow discharge of juice into the juice manifold 94.

Back pressure is preferably applied into the orifice tube, for example, by a hydraulic device as described in the incorporated by reference U.S. Pat. No. 5,992,311 or by limiting the size of the size of the restrictor. The orifice tube reciprocates within the strainer tube to compress any entrapped fruit particles and force any remaining juice through the perforated wall of the strainer tube. Core material, such as section membrane and seeds, are ejected typically from the lower portion of the orifice tube during reciprocating movement of that tube. This cycle of extraction is then complete.

Additionally, the amount of juice yield and the type of juice can be varied by using different strainer tubes with different size holes 98. Additionally, the back pressure can be changed to vary the juice yield and type of juice. Peel oil, such as liberated by the shredding action of the moveable and fixed cups' fingers, typically can be washed by water sprays around the extraction cups.

Figure 5:
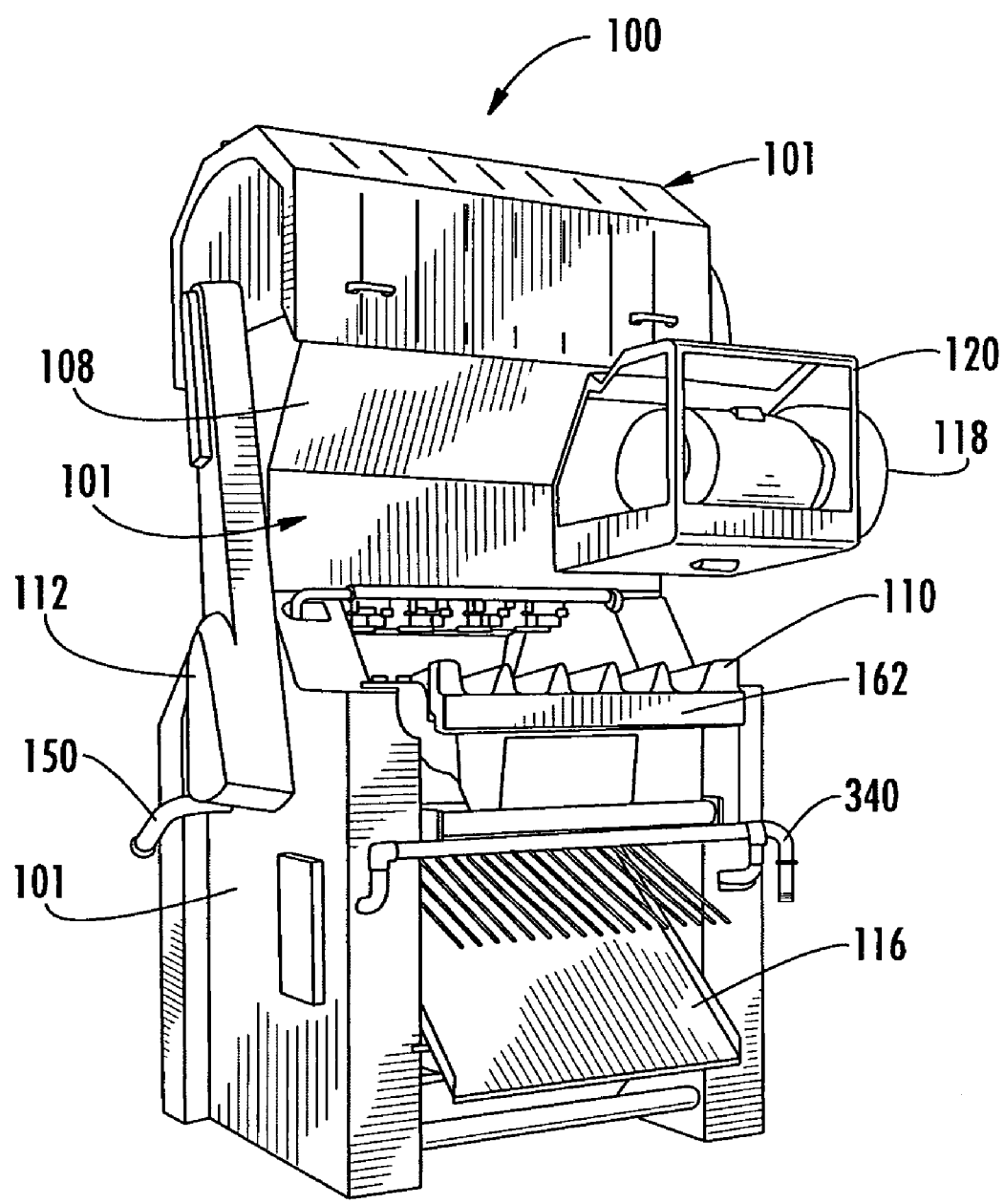
FIG. 5 is a perspective view of a juice extractor of the present invention showing an improved exterior design with integral electrical panels, ribbed covers, and the improved multi-lane feeder table formed as a hollow fruit guide body.
Figure 6:
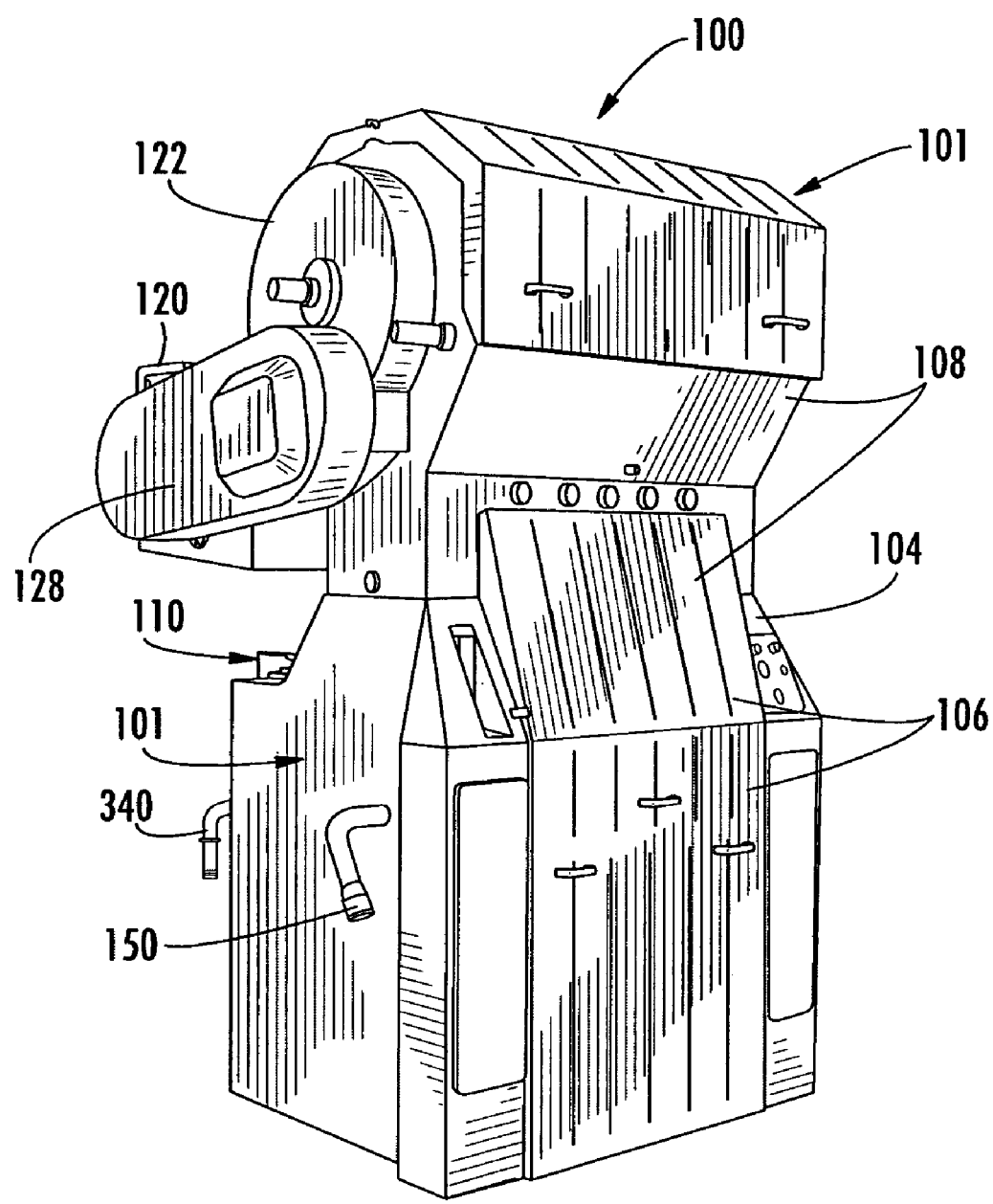
FIG. 6 is an enlarged rear perspective view of the juice extractor similar to FIG. 1, but looking from a different angle toward the rear of the extractor.
Figure 7:
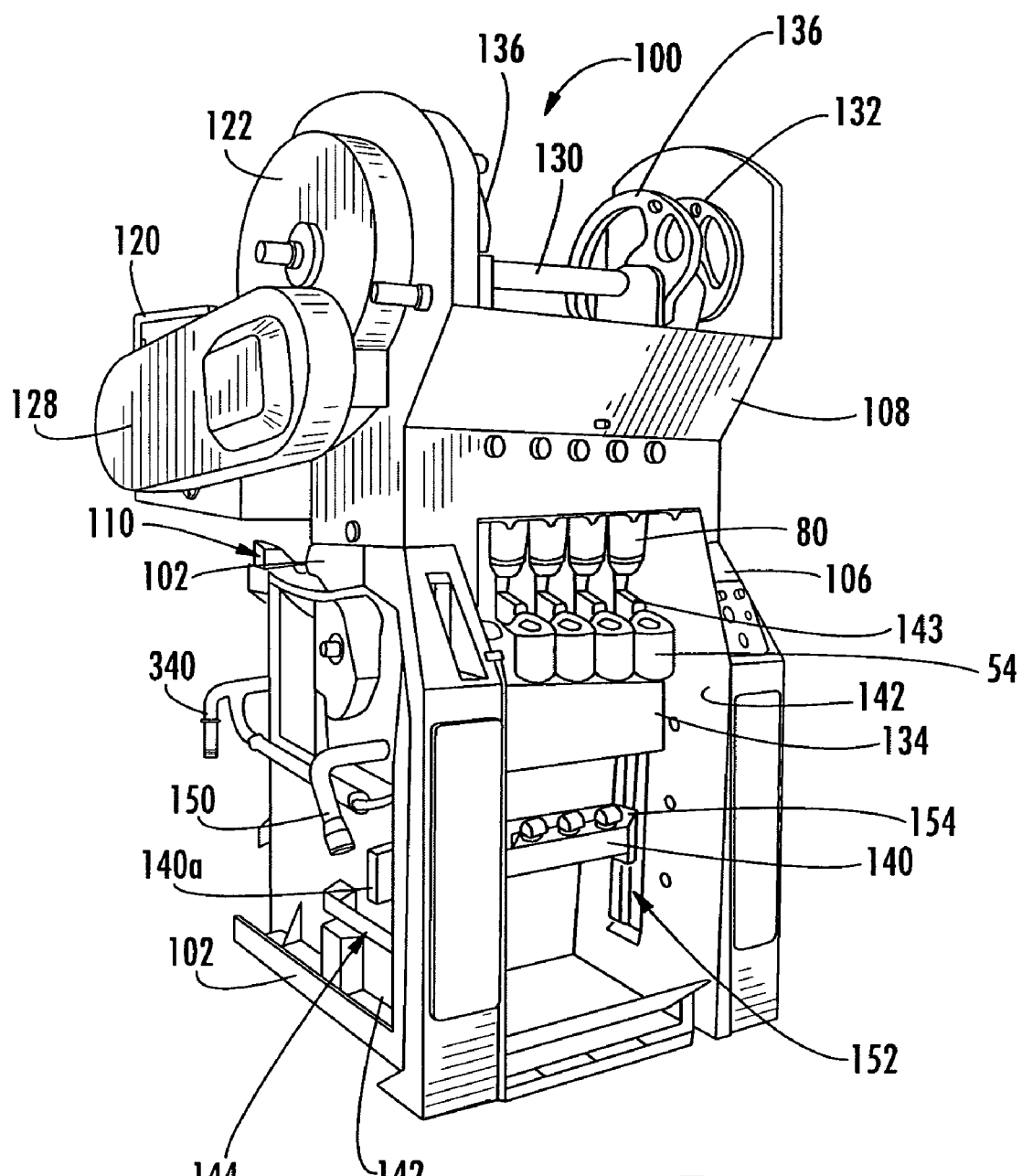
FIG. 7 is a perspective view similar to FIG. 6, but having the outer covers of the juice extractor removed and showing in detail the integrated cup bridge and juice manifold supporting the fixed extractor cups, the moveable extractor cups mounted on a moveable cup beam, inner wall members that define a drive mechanism cavity, and the orifice beam with its ends extending through a window opening into the drive mechanism cavity.

Referring now to FIGS. 1, 5, 6 and 7, there are illustrated different views of the juice extractor 100 of the present invention, including a respective front perspective view (FIG. 5), a rear perspective view from a first angle (FIG. 1), an enlarged rear perspective view from a second angle (FIG. 6), and a rear perspective view with outer covers removed (FIG. 7). The juice extractor 100 has an outer wall surface formed by outer covers 101, which are secured over the extractor frame 102 (FIG. 7). The outer covers 101 are configured to form a new shape of the juice extractor in the side areas and include integrated electrical panels 104 as shown in FIGS. 1 and 6. Ribbed covers 106 and a top slope 108 formed by the outer covers make an aesthetic and ornamental design.

The front perspective view of FIG. 5 shows a fruit guide assembly of the present invention forming a multi-lane feeder table 110 with an integrated deadhead. This fruit guide assembly 110 as a feeder table is formed as a hollow fruit guide body and is explained in greater detail below with reference to FIGS. 8-11. The feeder table 110 feeds fruit into a fruit feeder (not shown in detail) having fruit flipper fingers that convey fruit into the fixed extractor cups 54 shown in the non-limiting example as lower extractor cups. Details of the fruit feeder are described below relative to FIGS. 12 and 13. The fruit feeder is driven by a feeder drive mechanism, indicated generally at 112, which extends from a camshaft located in the upper portion of the juice extractor 100 and connects to the drive (or finger) shaft as will be explained in greater detail below. The improved design of this illustrated juice extractor 100 no longer has an external electrical box, air hose and protruding housing members.

As illustrated, only a few inlet and outlet fluid pipes are required for fluid intake and discharge, such as water or a cleaning fluid or juice exiting the juice manifold. A cycle of cleaning water can be flushed through the juice extractor, and its timing controlled by the control circuitry 114 shown in FIG. 2. The sloped discharge surface 116 shown in FIG. 5 and positioned under the feeder table 110 extends from an integrated cup bridge and juice manifold (not shown in detail in this figure) and allows misfed fruit to return. Greater details of the integrated cup bridge and juice manifold of the present invention are explained in greater detail below with reference to FIGS. 19-24.

FIG. 5 illustrates an electrical drive motor 118 supported by the extractor frame 102 and outside the outer cover 101. The drive motor 118 is enclosed within a protective steel mesh enclosure frame 120. The drive motor output shaft (not shown) connects to a large drive gear 122, which is connected by a gear train to an extractor frame mounted camshaft to be explained in greater detail below with reference to FIGS. 14-16.

FIG. 7 is a rear perspective view of the juice extractor 100 of the present invention with outer covers 101 removed and showing many of the improvements of the present invention, including the drive mechanism 128 for driving moveable extractor cups 80. The drive mechanism 128 is mounted in a top section of the extractor and includes a camshaft 130 that supports orifice beam drive cams 132 on the outer ends of the camshaft, but within the confines of the extractor frame 102. The fixed extractor cups 54 are supported on an integrated cup bridge and juice manifold 134 and receive the moveable extractor cups 80 supported on the cup beam or other moveable cup support member 82 and reciprocated into engagement with the fixed extractor cups. Two drive cams 136 each engage a cam follower (not shown) for driving the cup beam 82, allowing the moveable, e.g., upper extractor cups 80, to engage the fixed, e.g., lower extractor cups 54 supported by the integrated cup bridge and juice manifold 134 of the present invention. A return cam is not shown in this figure, but is explained relative to FIGS. 14 and 15, and is used for returning the cup beam into a disengaged (e.g., raised) position, thus disengaging the moveable extractor cups 80 from the fixed extractor cups 59. It should be understood, however, that the extractor cups can be arranged horizontally or in another orientation besides a vertically opposed relationship.

An orifice beam 140 supports the orifice tubes 56, which are received within respective strainer tubes 86. The orifice beam 140 reciprocates, moving the orifice tubes 56 within the strainer tubes 86, which are supported by the integrated cup bridge and juice manifold 134. As shown in FIG. 7, at least one outer end 140a of the orifice beam 140 extends through an inner side panel 142 into a drive mechanism cavity 144 formed between the inner side panel 142 and an outer cover 101 over the extractor frame 102 of the juice extractor 100. In a preferred embodiment, two opposing inner side panels 142 define a medial product material area 143, i.e., a "juice and peel" area where extractor cups are located. Opposing drive mechanism cavities are defined at either side of the juice extractor.

Figure 14:
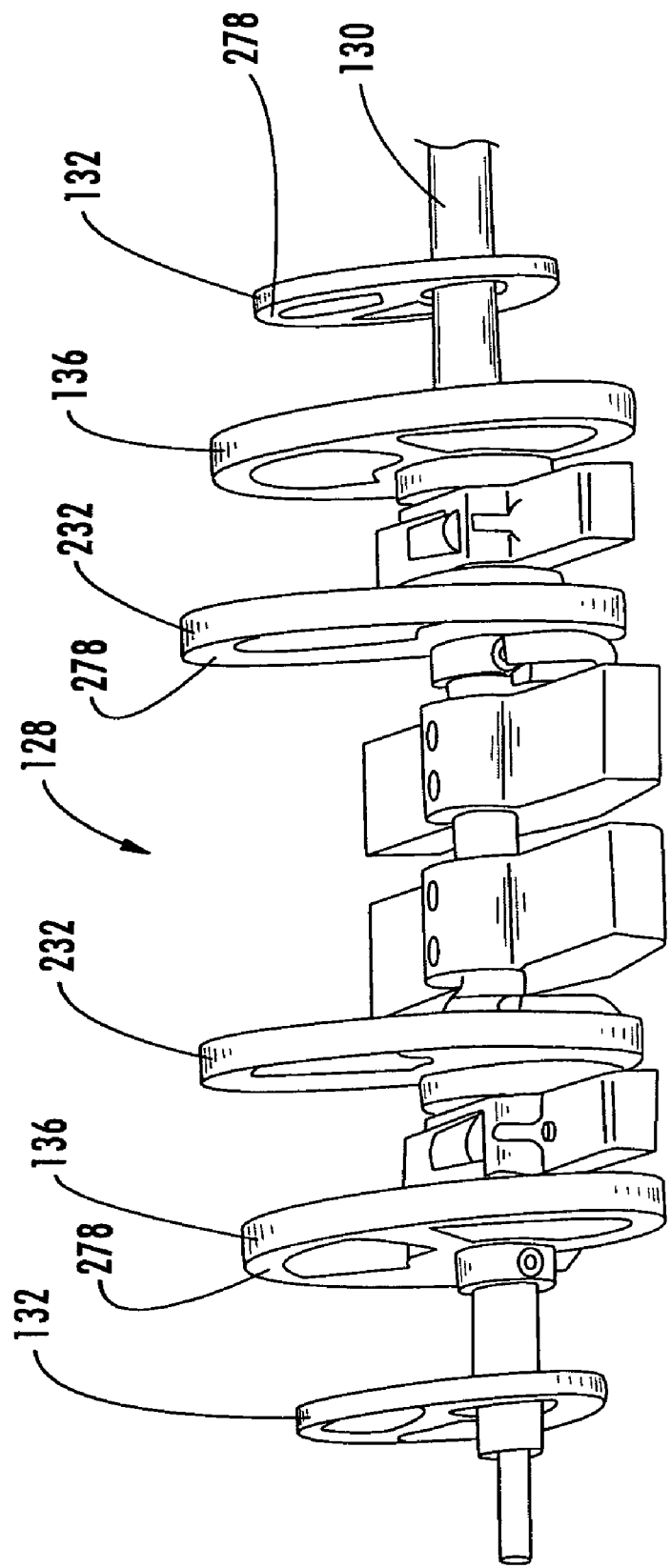
FIG. 14 is a fragmentary, partial perspective view of the camshaft for the juice extractor and showing in detail the cup drive cams for the moveable extractor cups, the return cams, orifice beam drive cams, and counterweights mounted on the camshaft.
Figure 16:
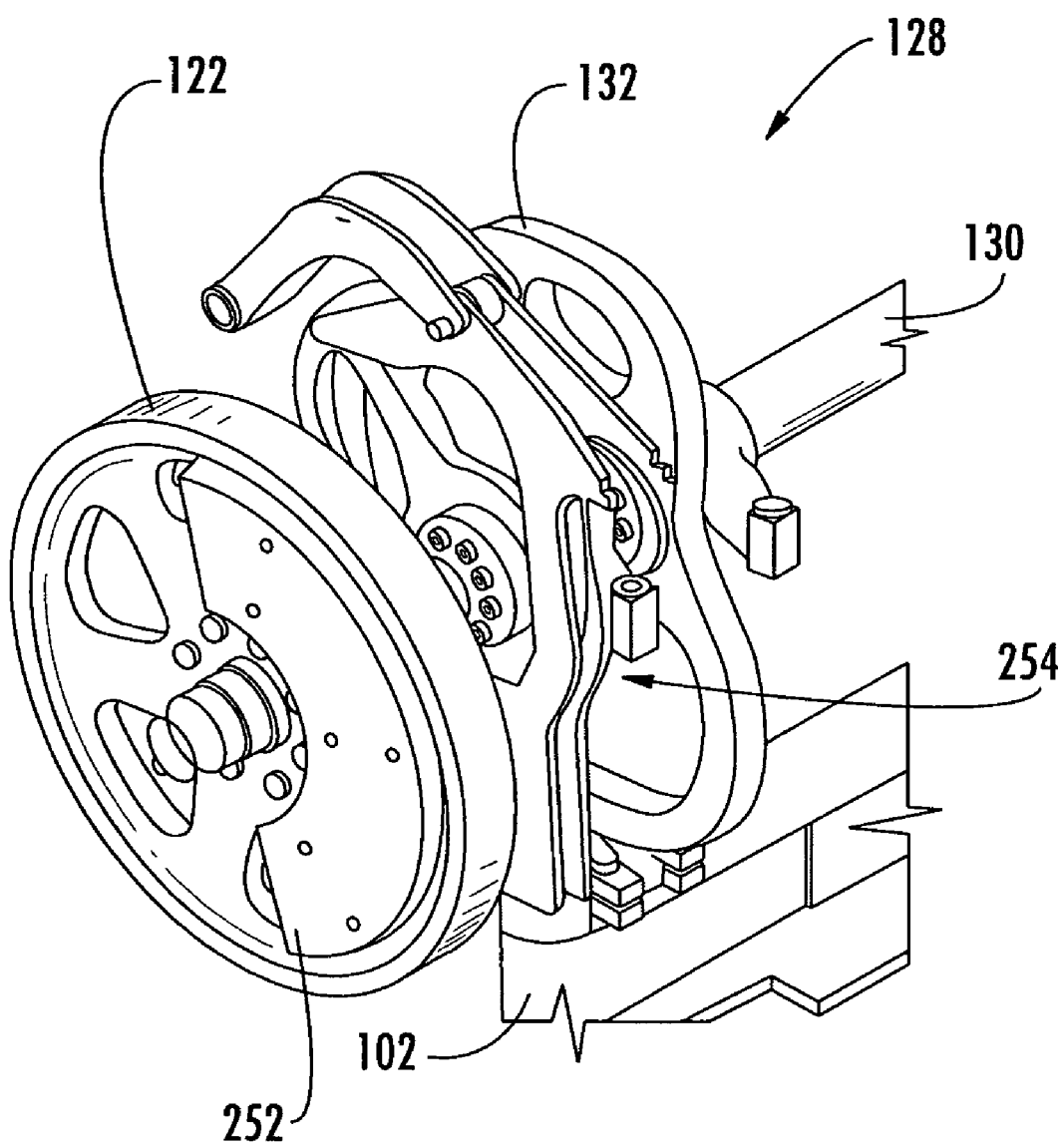
FIG. 16 is a fragmentary, perspective view of a counterweight mounted on the drive gear contained within the gearbox.
Figure 27:
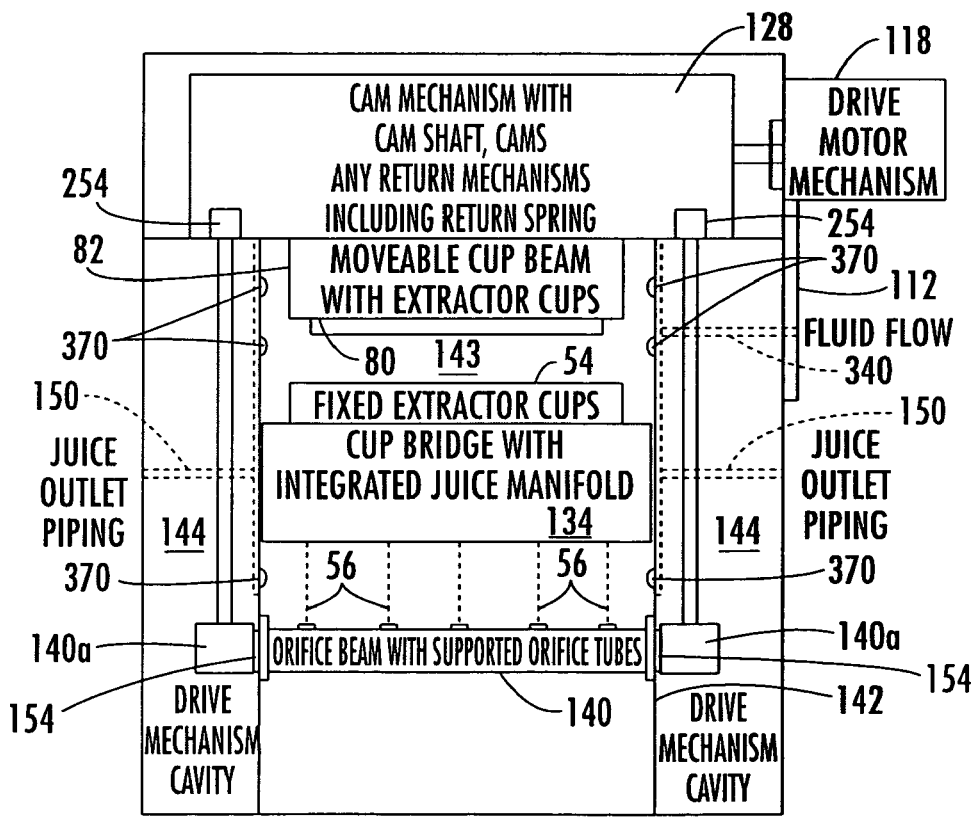
FIG. 27 is a fragmentary, front elevation view of a portion of the juice extractor showing basic components of the juice extractor, including the orifice beam mounted for movement with the extractor frame and tapered spray nozzles on the inner side panels, in accordance with the present invention.
Figures 28, 29:
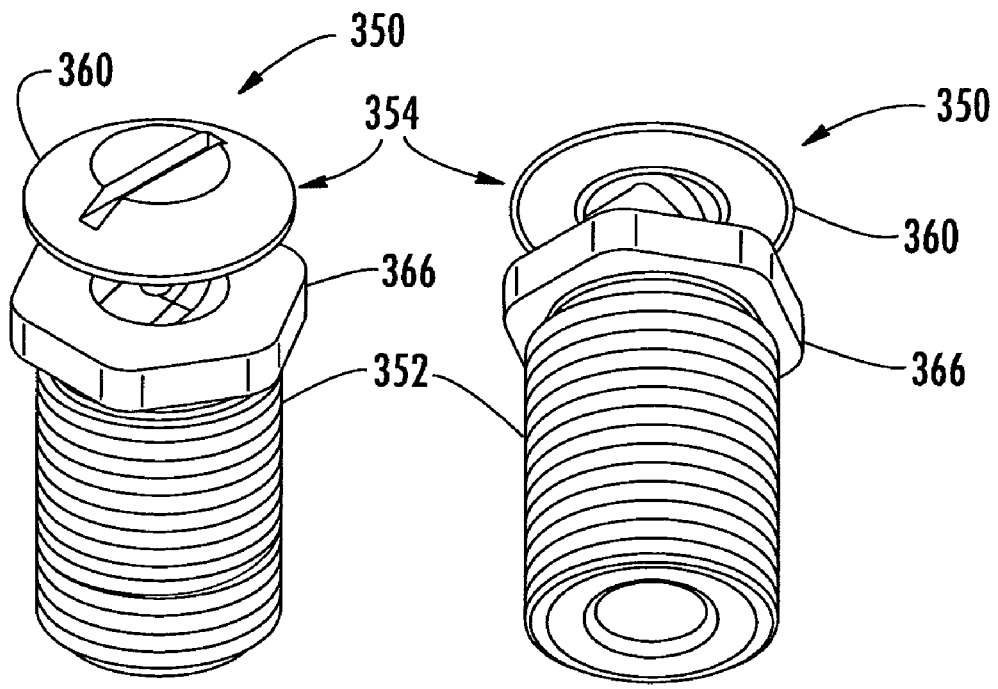
FIGS. 28 and 29 are perspective views of the pressure actuated spray nozzle used in the present invention.
Figure 30:
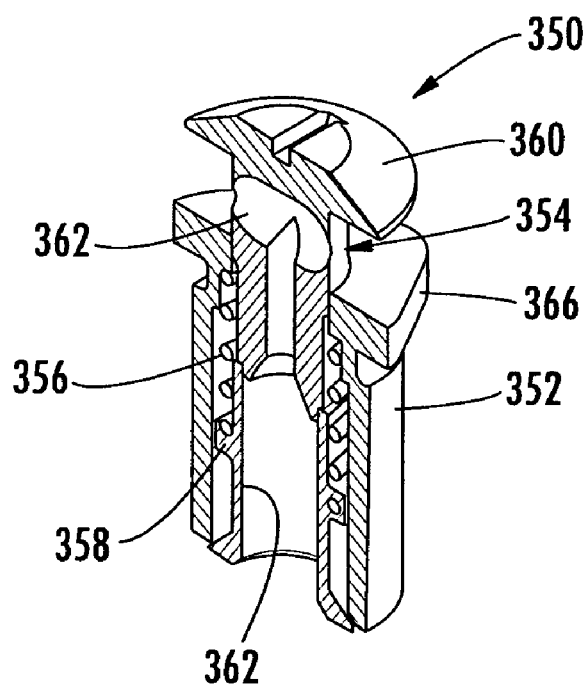
FIG. 30 is a fragmentary, sectional and perspective view of the spray nozzle shown in FIGS. 28 and 29.
Figure 31:
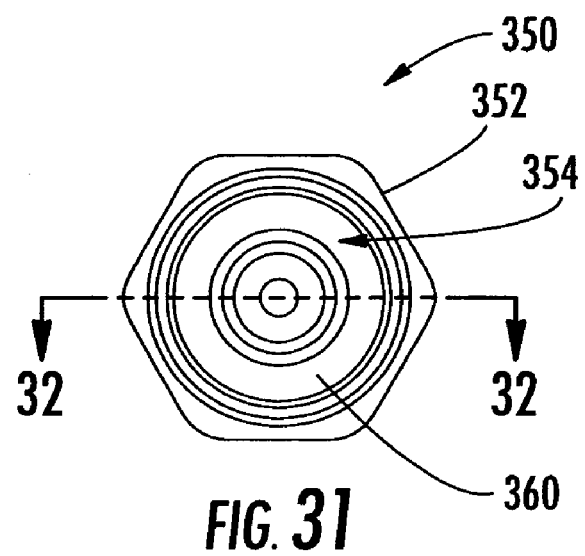
FIG. 31 is a top plan view of the spray nozzle shown in FIGS. 28 and 29.
Figure 32:
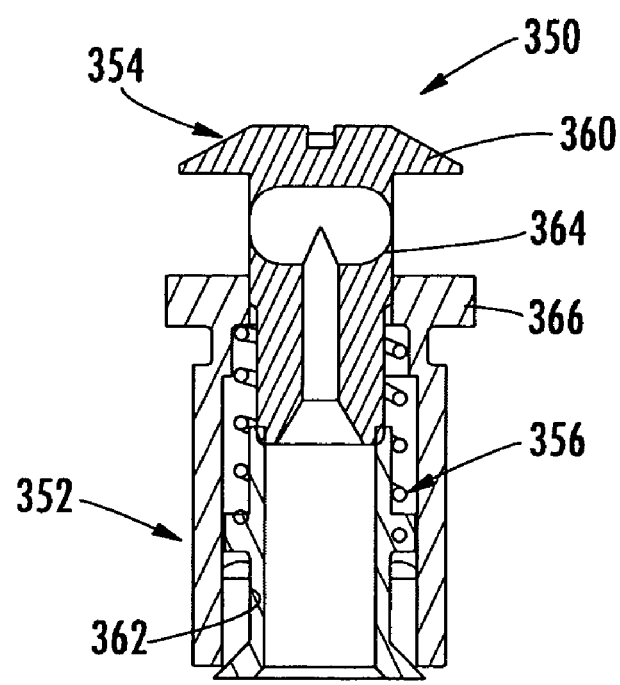
FIG. 32 is a sectional view of the spray nozzle taken along line 32-32 of FIG. 31.
Figure 33:
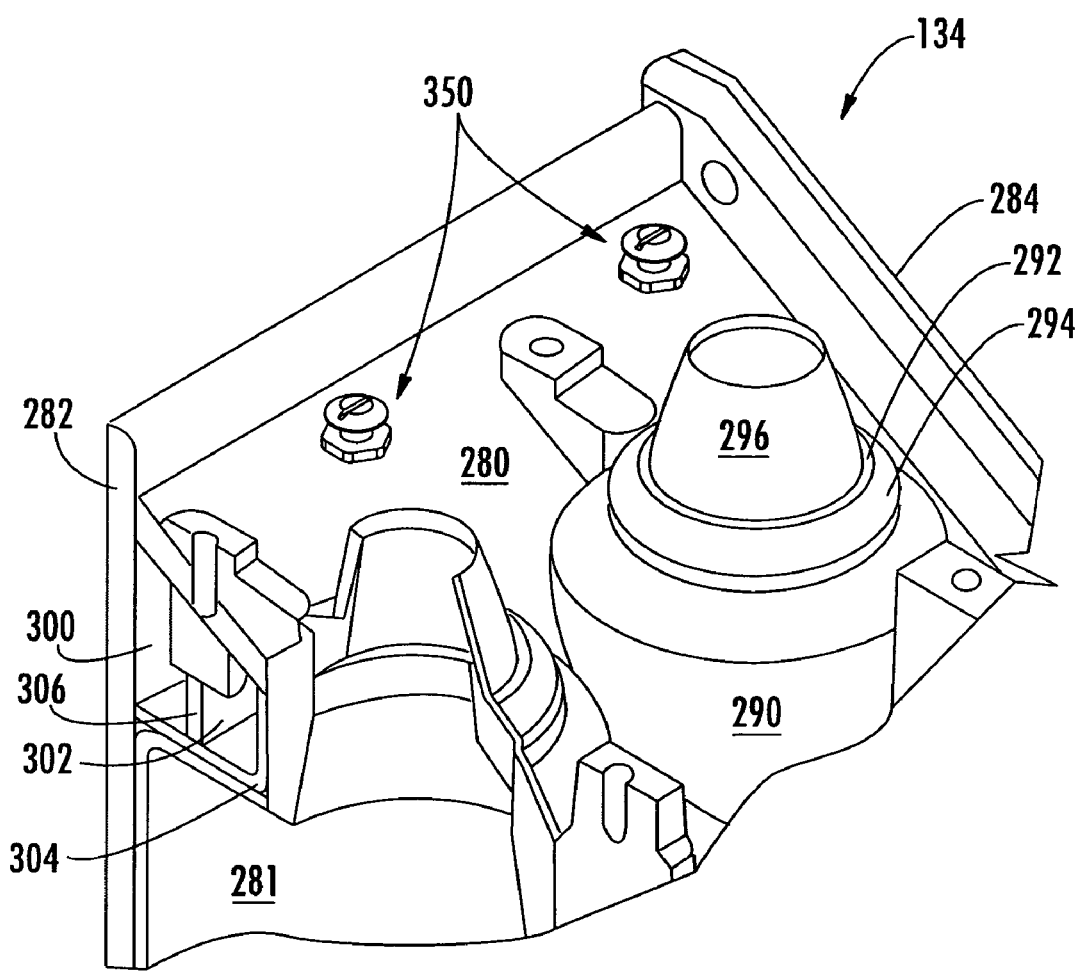
FIG. 33 is an enlarged, perspective view of a portion of the integrated cup bridge and juice manifold showing two pressure actuated spray nozzles of the present invention mounted thereon.
Figure 34:
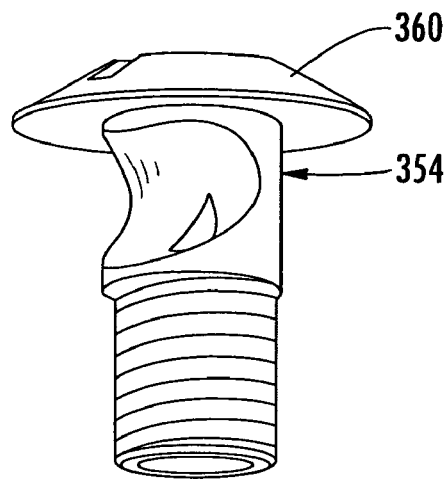
FIGS. 34 and 35 are perspective views of the nozzle body, i.e., the spray nozzle head shown in FIGS. 30 and 32.
Figure 35:
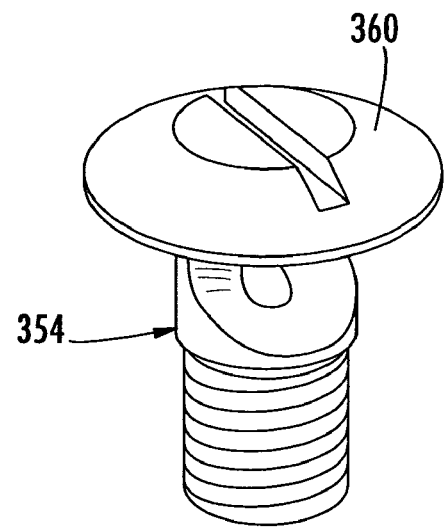
Figure 36:
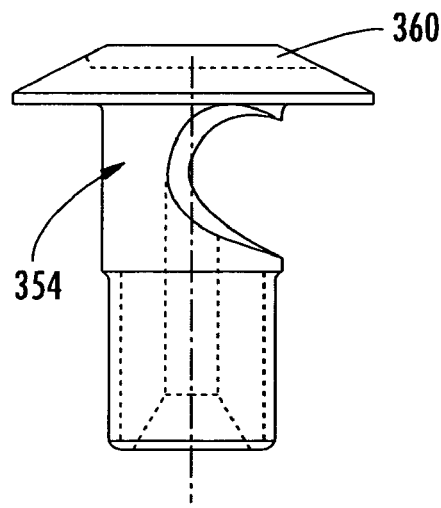
FIGS. 36 and 37 are respective side and front elevation views of the nozzle body shown in FIGS. 34 and 35.
Figure 37:
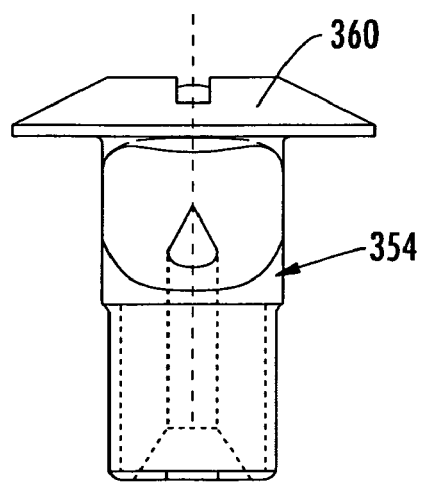
Figure 38:
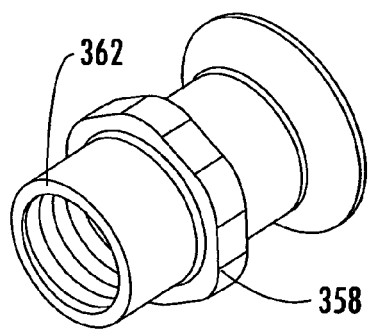
FIGS. 38 and 39 are perspective views of the lower portions of the nozzle body, i.e., the nozzle lower pintle shown in FIGS. 30 and 32.
Figure 39:
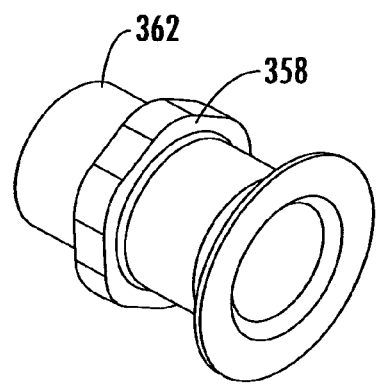
Figure 40:
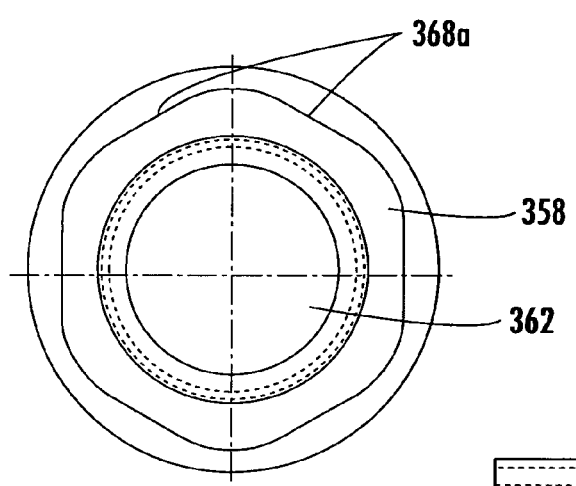
FIG. 40 is a top plan view of the lower nozzle body section shown in FIGS. 38 and 39.
Figure 41:
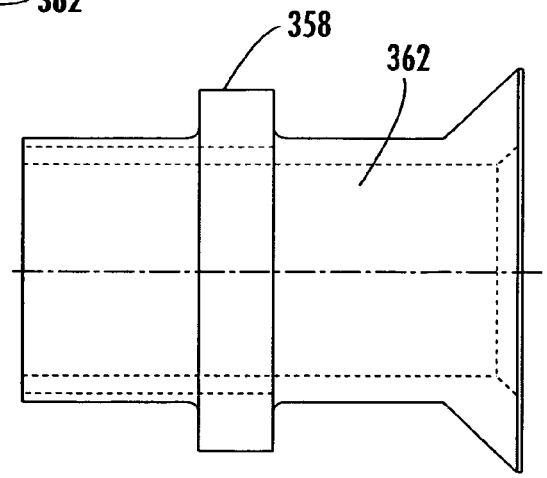
FIG. 41 is an elevation view of the lower nozzle body section shown in FIGS. 38 and 39.
Figure 42:
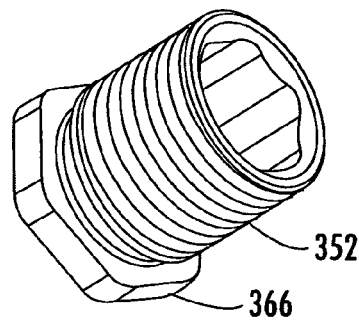
FIGS. 42 and 43 are perspective views of the tubular housing that receives the nozzle body as shown in FIGS. 30 and 32.
Figure 43:
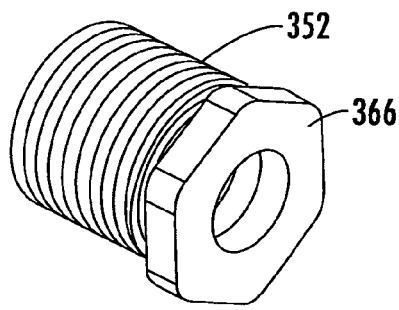
Figure 44:
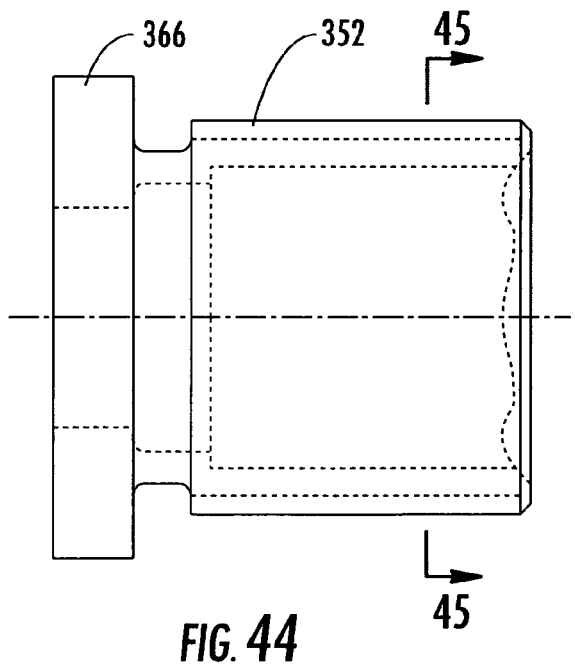
FIG. 44 is a side elevation view of the tubular housing shown in FIGS. 42 and 43.
Figure 45:
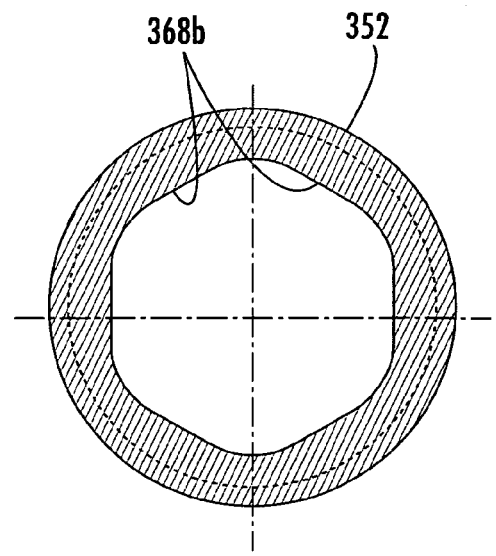
FIG. 45 is a sectional view taken along line 45-45 of FIG. 44.
Figure 46:
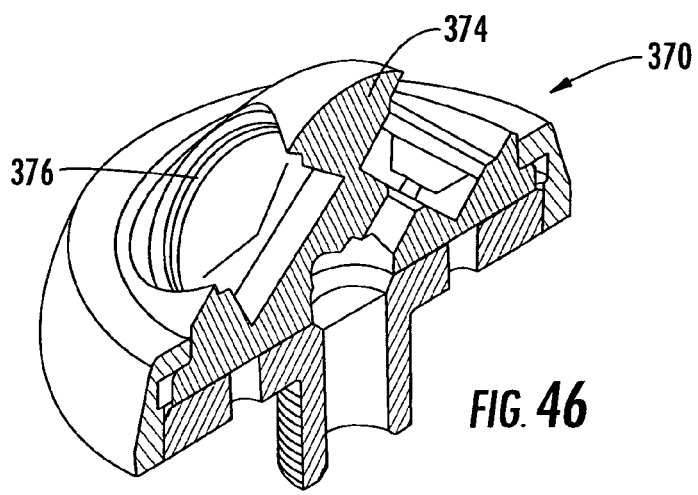
FIG. 46 is a partial sectional and perspective view of the tapered spray nozzle of the present invention adapted to be mounted flush on a wall at a fluid outlet within the juice extractor.
Figure 48:
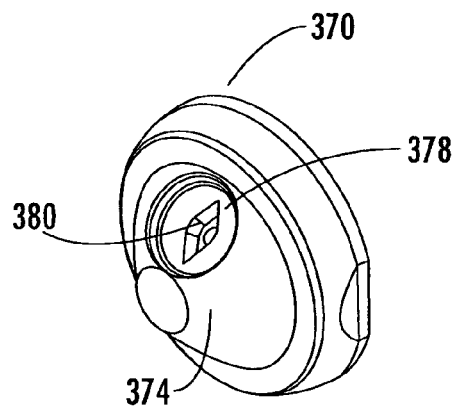
FIG. 48 is a perspective view of the tapered spray nozzle of the present invention.
Figure 47:
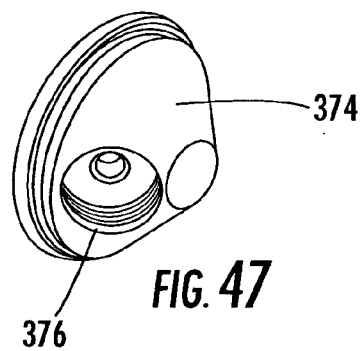
FIG. 47 is a perspective view of the spray nozzle head shown in FIG. 46.
Figure 49:
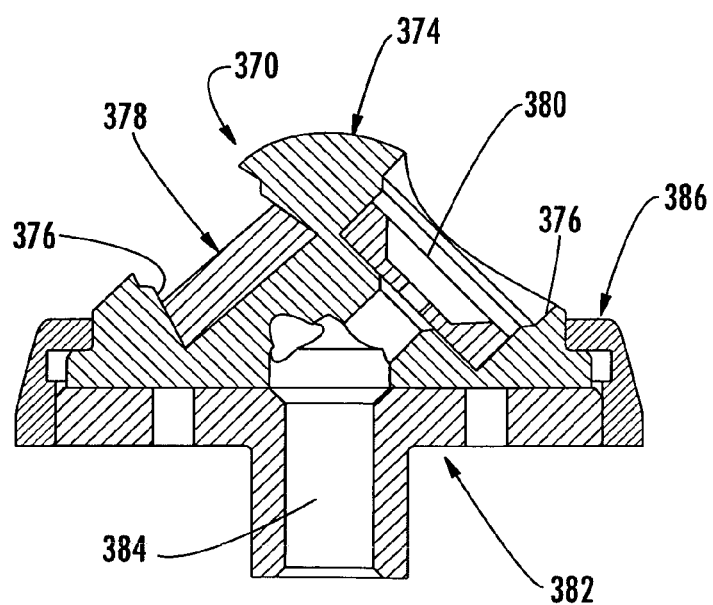
FIG. 49 is a sectional view of the tapered spray nozzle of the present invention showing basic components.
Figure 50:
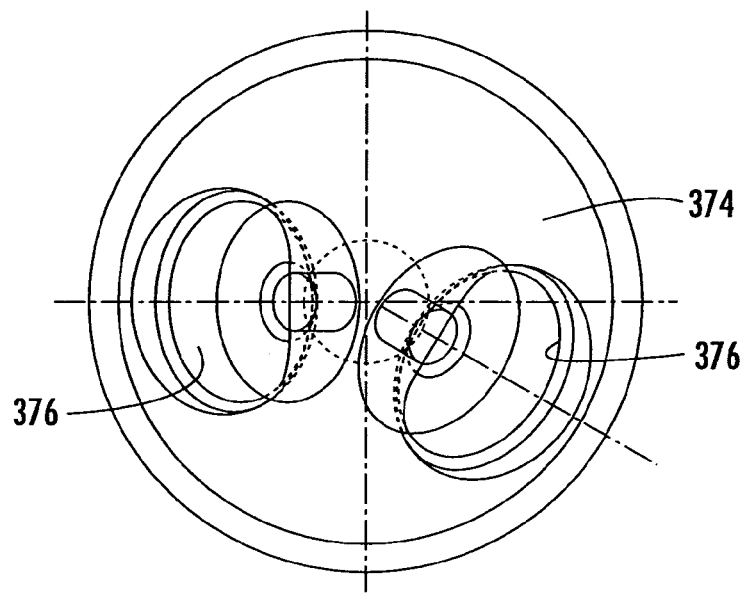
FIG. 50 is a top plan view of the spray nozzle head.
Figure 51:
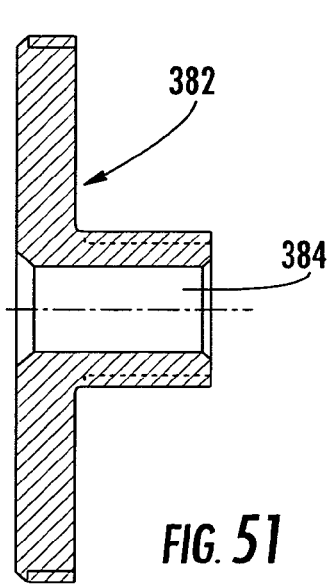
FIG. 51 is a sectional view of the nozzle fastening body shown in FIGS. 46 and 49.
Figure 52:
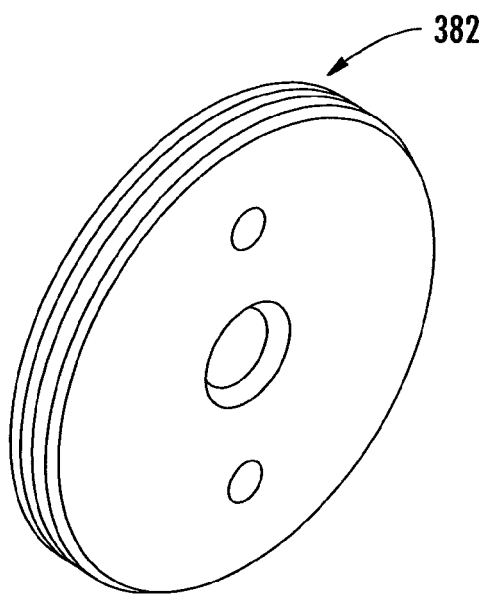
FIG. 52 is a front perspective view of the nozzle fastening body.

An appropriate drive mechanism, for example, a pull rod assembly or other drive assembly, is positioned within each drive mechanism cavity 144 and connected between the orifice beam end 144a and a cam follower mechanism that engages the orifice beam drive cam 132, shown in greater detail in FIGS. 14, 16 and 27. As the driven camshaft 130 rotates, the orifice beam drive cam 132 rotates, presses against a cam follower mechanism and associated pull-rod assembly or other drive assembly, and forces downward the orifice beam 140. A return spring mechanism (not shown) pulls upward on the orifice beam 140 through its pull-rod assembly, returning the orifice beam 140 to its initial position and forcing the orifice tube into the strainer tube for the juice extraction process.

To aid in cleanability of the juice extractor of the present invention, the integrated cup bridge and juice manifold 134 has its juice outlets juxtaposed at the inner side panels 142. Juice piping 150 connects to the juice outlets and extends out the side of the juice extractor as illustrated in FIGS. 7 and 27. The integrated cup bridge and juice manifold 134 are explained in greater detail relative to FIGS. 19-23.

The ends 140a of the orifice beam 140 are moveable within an access window 152 formed as window openings, i.e., a slot, in the inner side panels 142. A seal, and preferably a labyrinth seal 154, is positioned at the orifice beam end 140a and inner side panel 142 to form a moving "window." The seal 154 prevents debris from passing from the product material, i.e., "juice and peel" area 143 within the juice extractor 100 and into the drive mechanism cavity 144.

Any small amount of debris that passes through this seal 154 can be washed from the drive mechanism cavity 144 by one or more spray nozzles of the present invention that are positioned in the juice extractor, on side walls, including the inner side panel, and even in the drive mechanism cavity, which is explained in greater detail relative to FIG. 27 and FIGS. 46-54. Fluid that is sprayed into the juice extractor product material area 143 and even the drive mechanism cavity 144 can drain back toward the interior sections of the juice extractor machine, which is self-draining. Cleaning fluid and recycle fluid used for oil recovery can be discharged through appropriate fluid delivery conduits.

Figure 8:
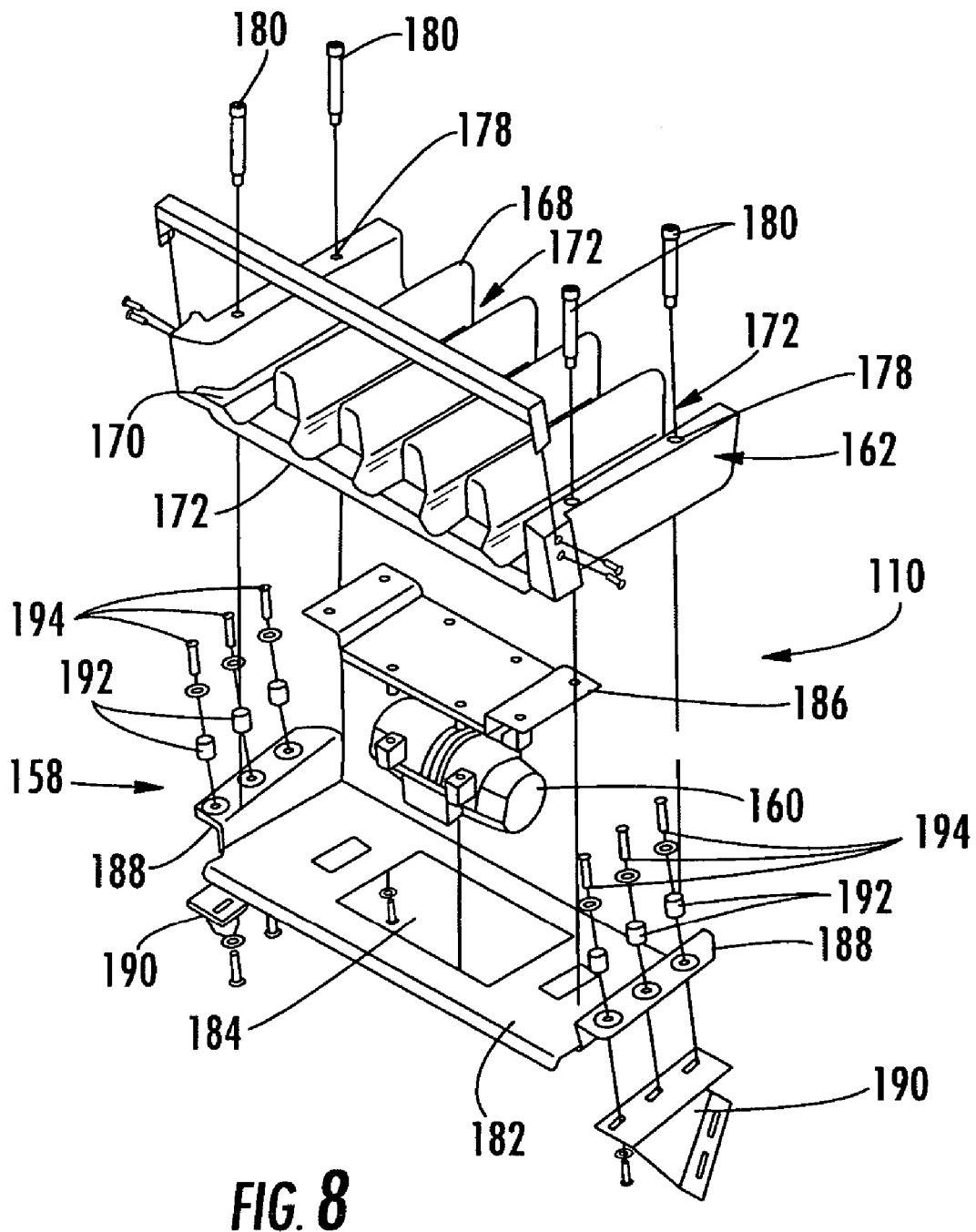
FIG. 8 is an exploded, perspective view of the fruit guide assembly of the present invention and showing an insertable hollow fruit guide body forming a feeder table and a top loading vibrator.
Figure 9:
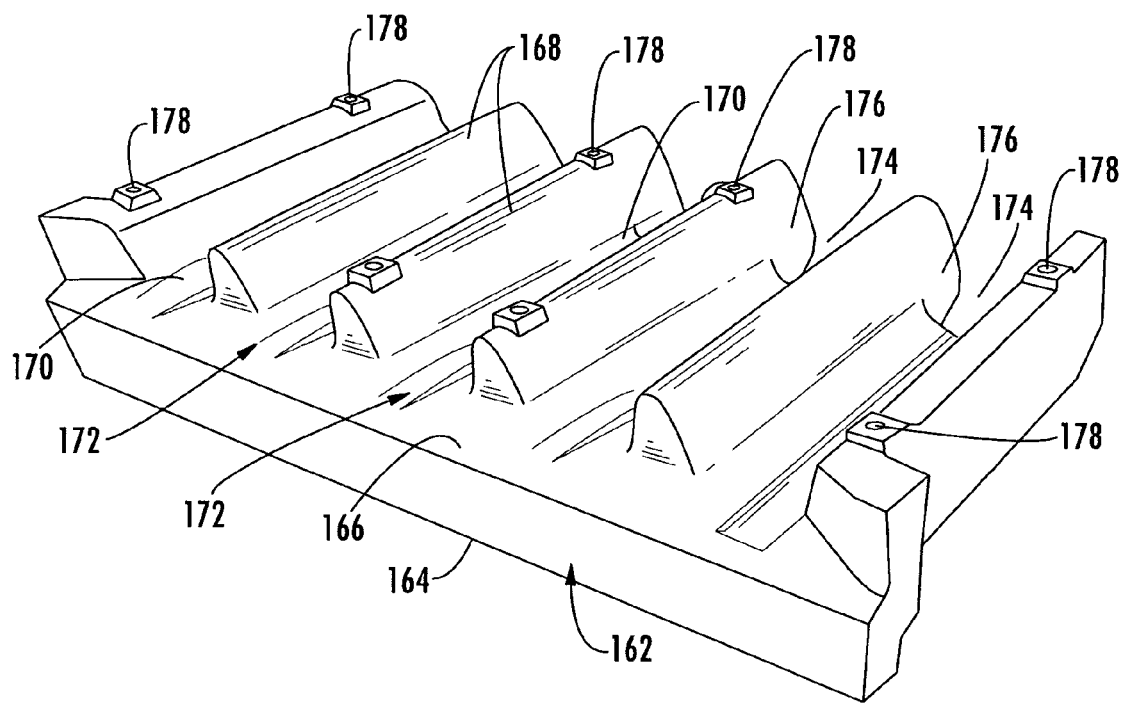
FIG. 9 is an enlarged perspective view of the hollow fruit guide body of the present invention.
Figure 10:
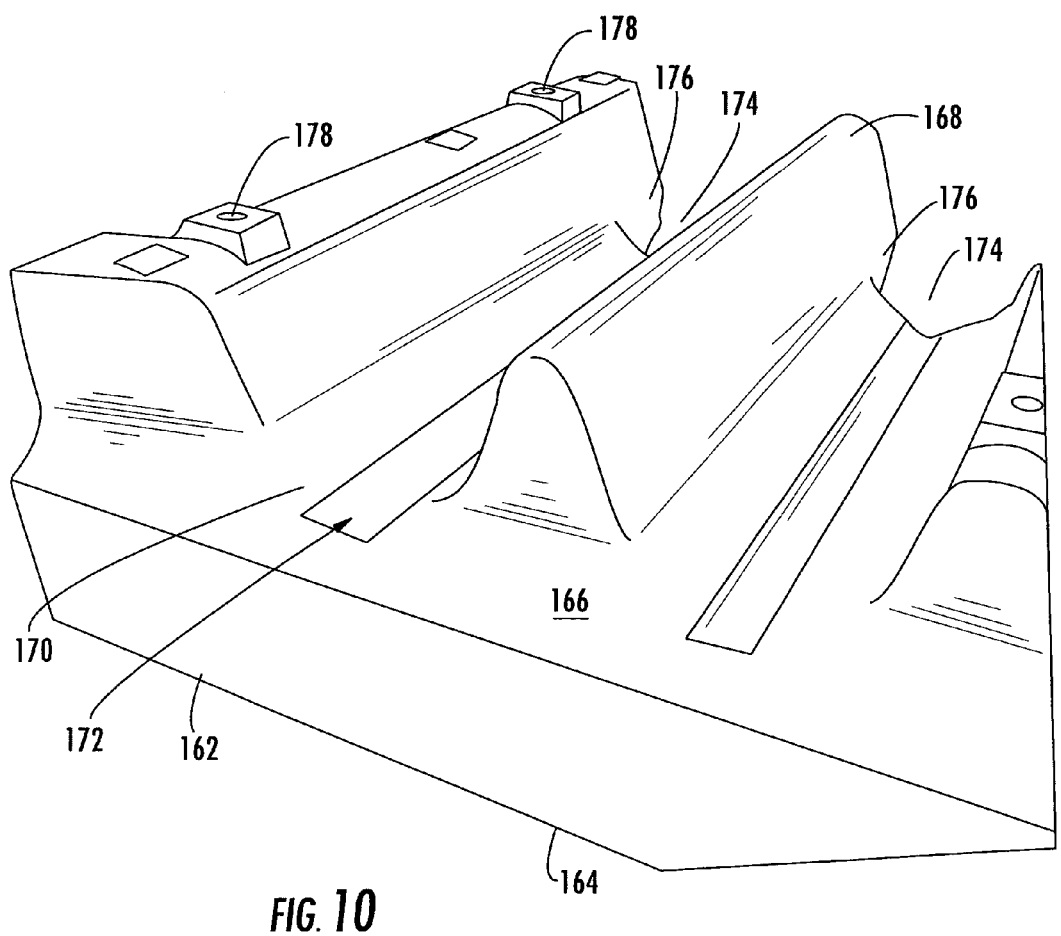
FIG. 10 is an enlarged perspective view of a portion of the fruit guide body showing fastener supports.

FIG. 8 shows an exploded isometric view of the insertable multi-lane feeder table 110, or fruit guide assembly as it is also referred, and the top loading vibrator of the present invention. Throughout this description, the term feeder table can be used interchangeably for fruit guide assembly when describing the present invention.

Figure 11:
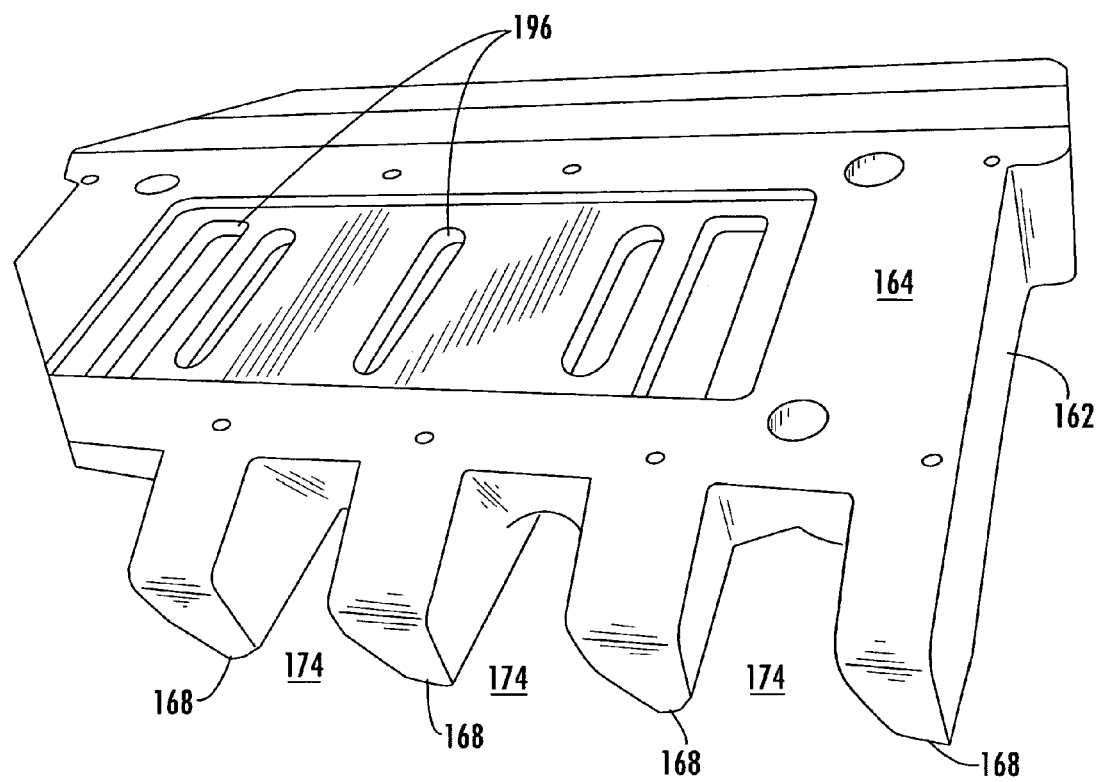
FIG. 11 is a bottom perspective view of the fruit guide body shown in FIG. 9 and showing structural supports as stiffening features.
Figure 12:
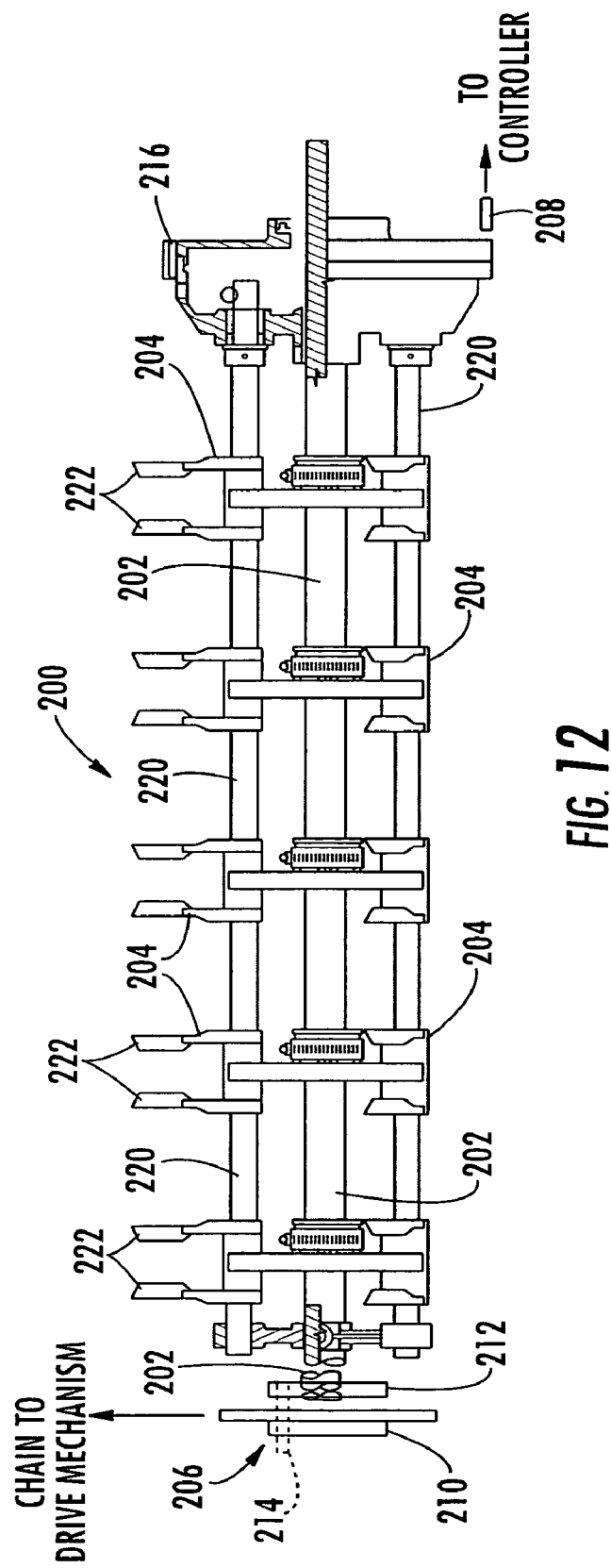
FIG. 12 is a front elevation and partial fragmentary view of the multi-position fruit feeder of the present invention showing a drive shaft, a plurality of fruit feed members, the load sensitive coupler, and decoupling detector.
Figure 13:
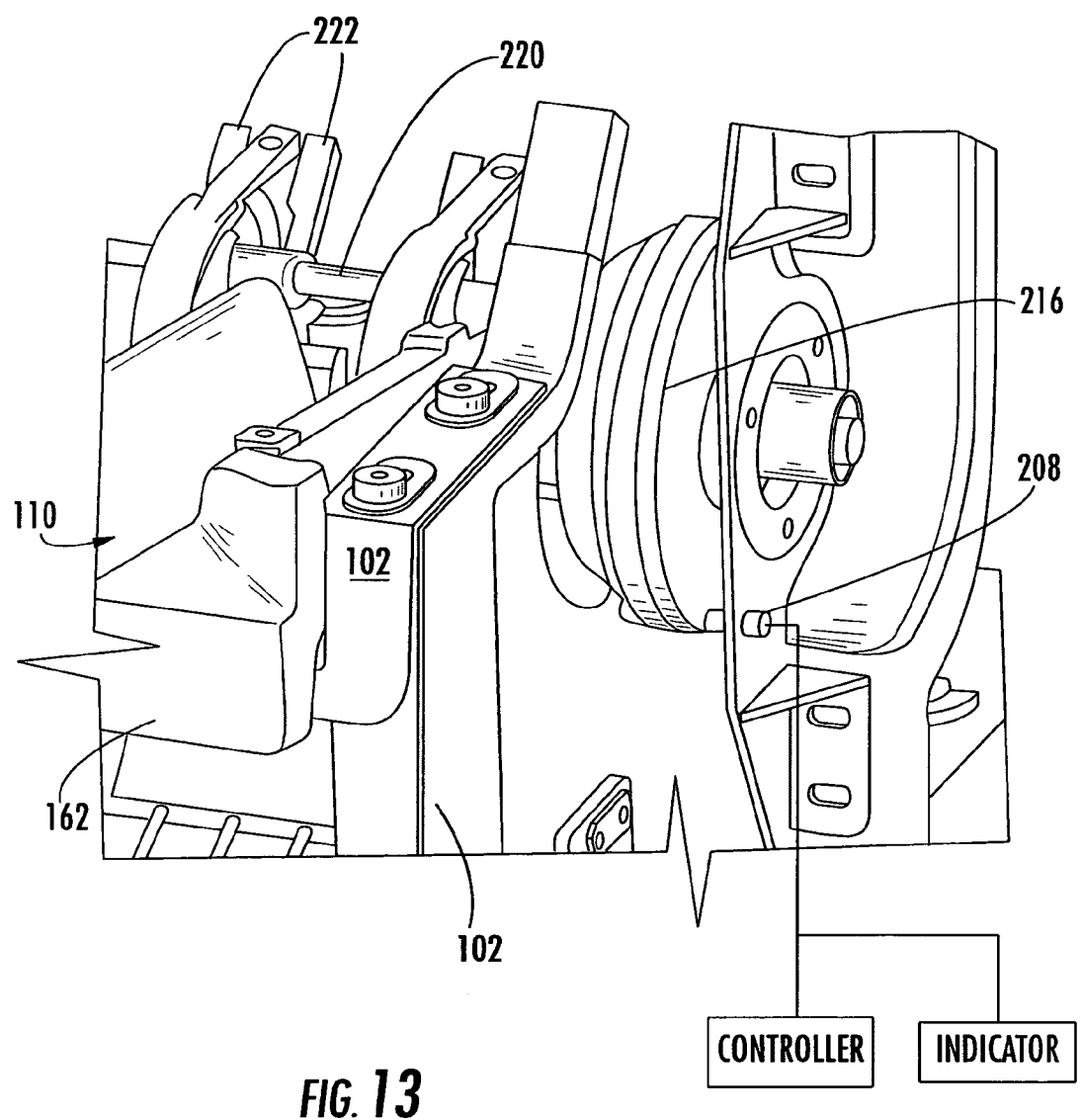
FIG. 13 is a perspective view of the fruit feeder and showing the use of a proximity switch in accordance with the present invention.

Referring now to FIGS. 8-11, the fruit guide assembly 110 of the present invention forms a feeder table and guides fruit from the fruit conveyor 34, such as shown in FIGS. 2 and 3, to a multi-position fruit feeder explained in greater detail relative to the description of FIGS. 12 and 13. The fruit guide assembly 110 includes a frame 158 that is positioned between the fruit conveyor 34 and the multi-positioned fruit feeder. A vibrator 160 is connected to the frame 150. The fruit guide assembly includes a hollow fruit guide body 162 that includes a bottom wall 164 and an upper wall 166 spaced therefrom. The upper wall 166 has a series of alternating ridges 168 and valleys 170 that define a plurality of fruit lanes 172. Each pair of adjacent ridges 168 extend outwardly beyond an end of an intervening valley 170 to define an opening 174 to permit passage therethrough of a corresponding portion of the multi-positioned fruit feeder and to define integrally formed cantilevered ridge ends 176 for supporting the fruit. Thus, it is evident that the present invention eliminates the deadhead that had been a separate part of a feeder table of prior art juice extractors in which a vibrator or other assembly vibrated a table, while the deadhead remained "static" or "dead" to slow vibration and enhance fruit feeding into fixed extractor cups 54.

This hollow fruit guide body 162 has a plurality of fastener receiving passageways 178 at both side and medial positions. A respective fastener 180 extends through each fastener receiving passageway 178 and fastens the hollow fruit guide body 162 to the frame 158 at the side and medial portions of the body 162. The fruit guide body 162 is removably fastened to the frame 158 and removable therefrom in an upward direction. The vibrator 160 is removably fastened to the frame to be removable in an upward direction.

In one aspect of the present invention, the frame 158 includes a base plate 182 and having an opening 184 in a medial portion. The vibrator extends at least partially through the opening 184 in the base plate 182 and is secured to a vibrator mounting plate 186 that secures to the base plate 182 over the opening 184. A pair of mounting ears 188 are formed at opposite sides of the base plate 182. A pair of brackets 190 are mounted to the frame 52 of the fruit juice extractor 100. A plurality of vibration dampeners 192 and associated fasteners 194 connect the pair of brackets 190 to the pair of mounting ears 188. The mounting plate 186 acts as a flange and is connected between the vibrator 160 and the base plate 182.

The hollow fruit guide body 162 preferably is formed from a polymer, such as rotationally molded polyethylene, but other plastic materials can be used as suggested by those skilled in the art. The bottom wall, as shown in FIG. 11, has stiffening features 196 adding strength to the structure, which can be formed during the molding process.

It is evident that the present invention now provides a feeder table, i.e., formed as a fruit guide assembly 110, which not only includes an easily removable fruit guide body, but also includes an easily removable vibrator 160, which saves on maintenance time and costs throughout the operational life of the juice extractor.

The present invention also provides a multi-position fruit feeder that uses a proximity switch, in one non-limiting example, to detect movement of a load sensitive coupler having a shear pin that is broken when the fruit feeder is jammed or a similar problem occurs. If the shear pin breaks, the load sensitive coupler no longer rotates, and a proximity sensor, for example, detects this change. A processor, for example, a programmable logic controller (PLC) or other mechanism, can automatically stop the juice extractor when the lack of rotation is detected. This is advantageous over prior art juice extractors, which continued running when foreign material jammed a fruit feeder, breaking the shear pin. In one aspect of the present invention, the proximity sensor can be attached to a timer. When the juice extractor is in operation, the proximity sensor detects movement and produces respective on/off pulses. If, after a predetermined period of time, the pulses are no longer detected, for example, when a shear pin is broken and rotation stopped, the juice extractor automatically shuts-down.

FIGS. 12 and 13 illustrate the improved fruit feeder 200 for feeding fruit into the juice extracting positions defined by each juice extractor unit 50 and defined by the fixed and moveable extractor cups 54,80. The fruit feeder 200 includes a proximity drive shaft 202 and a plurality of fruit feed members 204, for example, formed as fruit feed fingers for feeding fruit to the juice extracting positions 50 based upon rotation of the drive shaft 202. A load sensitive coupler 206 couples a drive motor, for example, the electric drive motor 118 via the feeder mechanism drive 112, to the drive shaft 202 during normal operation, and decouples the drive motor from the drive shaft 202 when the fruit feed members 204 become jammed. A decoupling detector 208 detects decoupling of the load sensitive coupler 206. In the embodiment shown in FIGS. 12 and 13, the drive motor could be the primary juice extractor drive motor 118 with a transmission linkage or other drive mechanism 112 that interconnects the drive shaft 202 and the electric motor 118 supported by extractor frame 52 and outside the juice extractor outer covers as shown in FIG. 5.

A drive hub 210 is rotatably carried by the drive shaft 202 and operatively connected to the drive motor 118. A fixed hub 212 is secured to the drive shaft adjacent the rotatable drive hub 210. A shear pin 214 extends between the rotatable drive hub 210 and the fixed hub 212 to couple the rotatable drive hub 210 and the fixed hub 212 together during normal operation, and to shear and decouple the rotatable drive hub 210 from the fixed hub 212 when the fruit feed members 204 become jammed. This decoupling detector 208, in one aspect of the present invention, is preferably a proximity sensor. Also, at least one proximity sensor trigger 216 is rotatably carried by the drive shaft 202. When the proximity sensor is positioned adjacent a path of the at least one proximity sensor trigger 216, a pulse is preferably generated. For example, the proximity sensor trigger could be at least one ferrous fastener, for example, screws that act as the trigger. These screws could be carried by the rotatable drive hub 210. The proximity sensor can also be connected to a timer. When the juice extractor is running, the proximity sensor detects the movement of the trigger and produces on/off pulses. If, after a predefined period of time, the pulses are no longer detected, the juice extractor will automatically shut down via the controller.

In one aspect of the present invention, a fruit feed member 204 includes at least one finger shaft 220 and a plurality of fruit flipper fingers 222 carried by the finger shaft. In a preferred aspect of the present invention, three equally spaced finger shafts 220 are used. The central drive shaft 202 is driven, turning a cam assembly (not shown) inside the hub, which rotates, and the three shafts 220 rotate around the center drive shaft 202, moving the fruit flipper fingers 222 for lifting the fruit and feeding or "tossing" the fruit into a fixed extractor cup 54.

In yet another aspect of the present invention, a decoupling detector operates an indicator based upon the detection of decoupling. In one aspect of the present invention, it could include at least one magnetic sensor, an optical sensor, an electrical field sensor, an ultrasonic sensor or an infrared sensor, as non-limiting examples.

The juice extractor of the present invention also advantageously uses a return cam, typically formed as a mathematical conjugate of the extractor cup drive cam, i.e., cup cam, to hold cam followers to the cams and lift the cup support member, i.e., cup beam, during the juice extraction cycle. This overcomes the disadvantage of having to increase the spring force necessary to hold cam followers tightly to the drive cam or use higher air pressure to prevent "knocking" of the cams corresponding to the separation of any cam from its follower.

Figure 15:
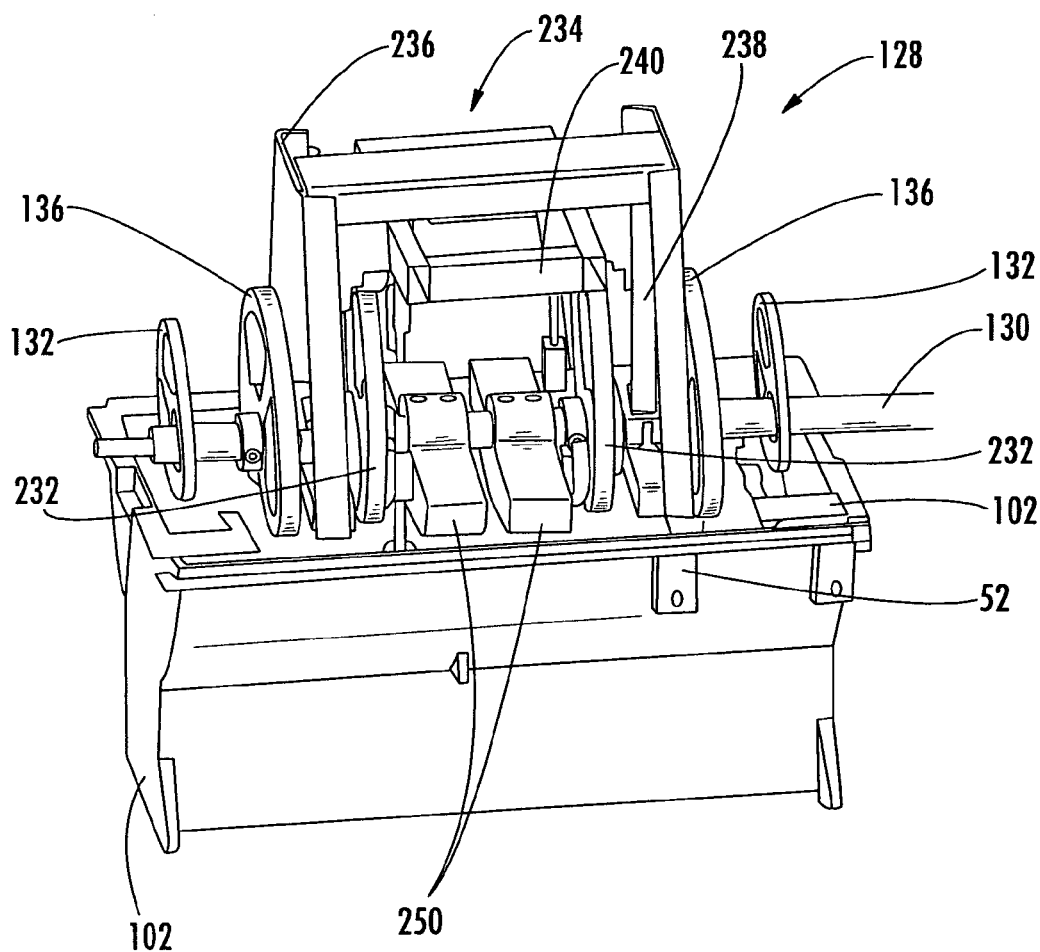
FIG. 15 is another isometric and partial fragmentary view of the camshaft of the present invention and showing the upper main and cam follower train used for the return cam.

FIGS. 14 and 15 are isometric views of the drive mechanism 128 that engages the moveable extractor cups 80, such as through the moveable cup beam or other moveable cup support member 230, and drives the moveable extractor cups 80 into engagement with the fixed extractor cups 54. This drive mechanism 128 includes the camshaft 130 supporting the drive cam 136 for driving the moveable extractor cup 80 into engagement with the fixed extractor cup 54 and a return cam 232 for disengaging the moveable extractor cup 80 using a cam follower train 234 operatively connected to the return cam 232 for raising the cup beam 230 and disengaging the moveable extractor cup 80 (FIG. 15).

As illustrated, the camshaft 130 supports two drive cams 136 and two return cams 232 that are spaced from each other, and imparts a driving force onto the respective cup beam 230 and cam follower train 234, which operate at appropriate timed intervals as the camshaft is rotated. The cam follower train 234 includes appropriate support frame members 236 that are secured to the extractor frame 52 and guide rods 238. A cam follower mechanism 240 is slidable on the guide rods 238 and secured to the cup beam 230 or other cup support member. The return cam drives upward the cam follower mechanism 240 on the guide rods 238, thus pulling upward the cup beam 230.

As illustrated, two orifice beam drive cams 132 are located on outer ends of the camshaft 130 within the extractor frame and each connect to a cam follower and drive linkage that extends into the drive mechanism cavity 144 and attach to an end 140*a* of the orifice beam 140. The orifice beam drive cams 132 push the orifice beam downward via the cam follower and drive linkage, which is, in turn, pulled upward by a spring mechanism (not shown), allowing reciprocating movement of the orifice beam and the orifice tube within the strainer tube.

In one preferred aspect of the present invention, the return cam 232 is formed as a mathematical conjugate of the drive cam 136. The drive cam 136 and return cam 232, however, can be formed integral as two cam surfaces on a single body, or each can be formed as a single cam body as shown in the non-limiting example of FIG. 14.

To provide balance to the juice extractor machine during extractor operations, a counterweight is added to balance the offset nature of the camshaft. In the embodiments shown in FIGS. 14 and 15, two counterweights 250 are secured to the central portion of the camshaft 130 and offset the concentric rotation of the cams, which causes vibration of the juice extractor during extractor operation. In another embodiment of the present invention shown in FIG. 16, a counterweight 252 is added to the main drive gear 122, which could be positioned in a gearbox. FIG. 16 shows the main drive gear 122 that is connected to the camshaft 130, and also the orifice beam drive cam 132 and a portion of the cam follower and drive linkage 254 that connects to a return spring and a drive linkage mechanism contained in the drive mechanism cavity 144 for reciprocating the orifice beam as the camshaft is rotated. It is evident, then, in accordance with the present invention, the counterweight can be mounted directly on the camshaft, for example, as the illustrated two counterweight members 250 mounted on a medial section of the camshaft, or mounted as a separate counterweight 252 on the large gear in the gearbox. Alternatively, both counterweights 250, 252 could be used depending on the particular design choice of one skilled in the art.

Figure 17:
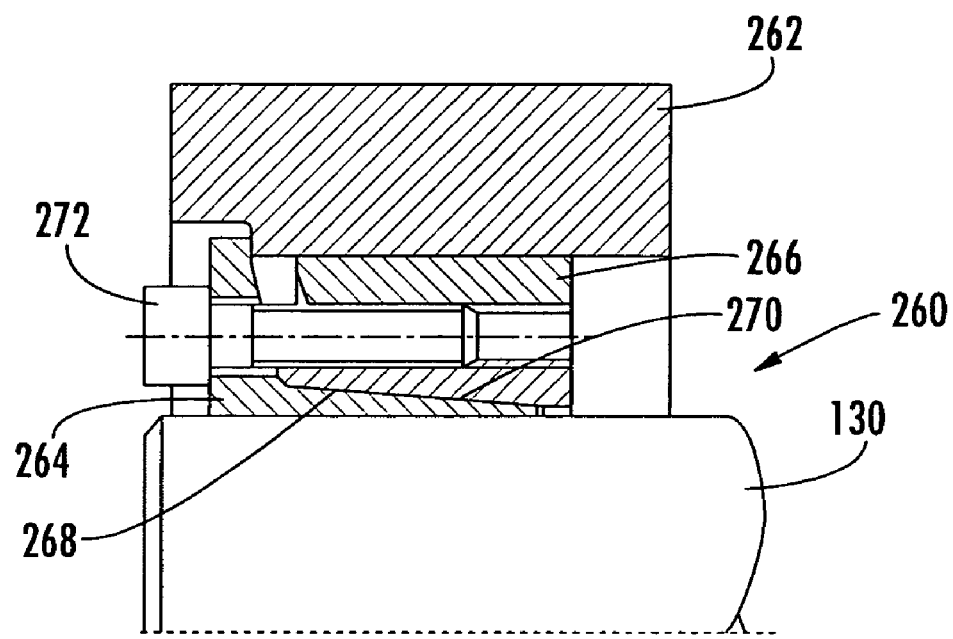
FIGS. 17 and 18 are sectional views showing a shaft-hub coupler frictionally securing together the camshaft and hub of the cams, with FIG. 17 showing a countersunk flange, and FIG. 18 showing a flange outside the hub bore.
Figure 18:
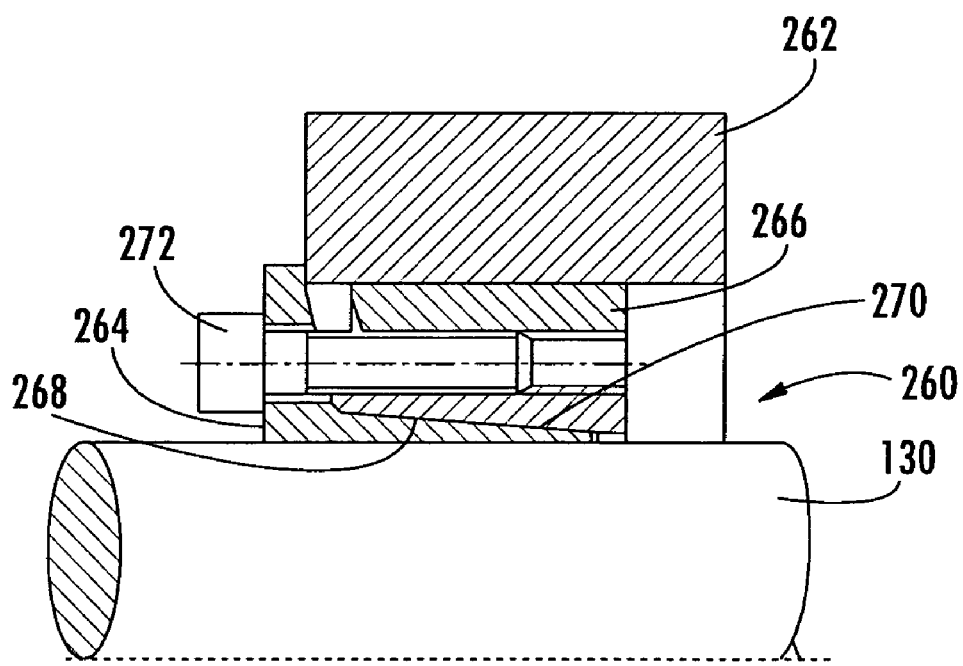

In accordance with the present invention, the various cams 132, 136 and 232 can be mounted to the camshaft 130 using a cup-drive, shaft-hub coupler 260 that frictionally secures the camshaft 130 with the cam hub 262 as shown in FIGS. 17 and 18. Non-limiting examples of the coupler 260 that can be used in the present invention include locking assemblies sold under the designation Ringfeder®, RfN 7013.1, which could be hub mounted with a countersunk flange as shown in FIG. 17, or with a locking assembly flange outside the hub bore, as shown in FIG. 18.

As illustrated, the camshaft 130 and the cam hub 262 of either the drive cam 136, return cam 232 or orifice beam drive cam 132, are cylindrically shaped and devoid of keying. The coupler 260 preferably includes inner and outer rings 264, 266 having respective tapered overlapping surfaces 268, 270 and at least one fastener 272 such as the illustrated bolt for urging the inner and outer rings 264, 266 axially together. A flange can be connected to the inner ring to aid in preventing lateral movement of different members.

Each cam preferably includes at least one alignment feature 278 for facilitating relative alignment. This alignment feature could be an opening formed in each of the cams to permit an alignment rod to be inserted through the openings when the cams are relatively aligned properly to each other.

The juice extractor of the present invention also includes the integrated cup bridge and juice manifold 134 as shown in FIGS. 19-24. Juice piping extends from the opposing juice outlets positioned at the inner side panels and exits through the side of the juice extractor at the outer covers, thus eliminating the prior art piping arrangement where "bullhorn" pipes extended out the front and were prone to build-up of debris. As will also be explained below in greater detail, the strainer tube 86 is preferably bottom loaded, and includes an improved sealing assembly between the juice manifold and strainer tube. The integrated cup bridge and juice manifold 134 also includes a number of pressure actuated spray nozzles, i.e., pop-up nozzles, positioned on the integrated cup bridge and juice manifold 134. These pop-up nozzles can be used for both oil recovery and extractor cleaning as will be explained in greater detail below.

Referring now to FIGS. 19-24, greater details of the integrated cup bridge and juice manifold 134 of the present invention are illustrated. The integrated cup bridge and juice manifold 134 includes a front sloped wall 280 to permit product material to flow away from the structure during extractor operation. The integrated cup bridge and juice manifold 134 is preferably formed as a fabricated assembly that includes a weldment and associated construction forming an integrated juice manifold 281 within the assembly, as shown in greater details in FIGS. 20, 23 and 24. The integrated cup bridge and juice manifold 134 includes a rear wall 282, the front sloped wall 280, side end walls 284, and the bottom wall as a weldment 286. Fixed extractor cup positions 288 are defined by extractor cup mounts 290 that are substantially cylindrically formed and include a top flange 292 and mounting ridge 294 on which strainer tube support cones 296 are received.

As illustrated in FIG. 7 and described before, the integrated cup bridge and juice manifold 134 is mounted within the extractor frame between the inner side panels 142, and includes juice outlets 298 juxtaposed to the inner side panels, such that the juice outlets are removed from the product material 143, i.e., "juice and peel" area, to prevent build-up of peel and related byproducts. Build-up of byproducts was typical when juice outlets and the associated piping exited the juice extractor, for example out the front or rear, as "bullhorn" piping. As illustrated, the integrated cup bridge and juice manifold 134 extends transversely across the extractor frame 52 between the opposing inner side panels 142.

As shown in FIGS. 19-21, 23 and 24, the integrated cup bridge and juice manifold 134 includes at least one fluid delivery conduit extending along an upper portion of the structure where the rear wall 282 and front sloped wall 280 intersect. In the illustrated preferred embodiment shown in FIGS. 19-20, and 23-24, first and second fluid delivery conduits 300, 302, are formed by a L-bracket 304 and a medial insert wall 306 to define the first and second fluid delivery conduits 300, 302. Each conduit 300, 302 has a first fluid inlet 308 in a side end wall 284 to be connected to a source of pressurized fluid and at least a first fluid outlet 310 positioned on an outer surface of the integrated cup bridge and juice manifold 134, and more particularly, on the front sloped wall 280 for discharging fluid such as recycle fluid, for oil recovery during extractor operation. The second fluid delivery conduit 302 has a second fluid inlet 312 to be connected to a source of pressurized fluid, and at least a second fluid outlet 314 positioned on an outer surface of the integrated cup bridge and juice manifold 134, and preferably on the front sloped wall 280 for discharging fluid for cleaning.

Figure 19:
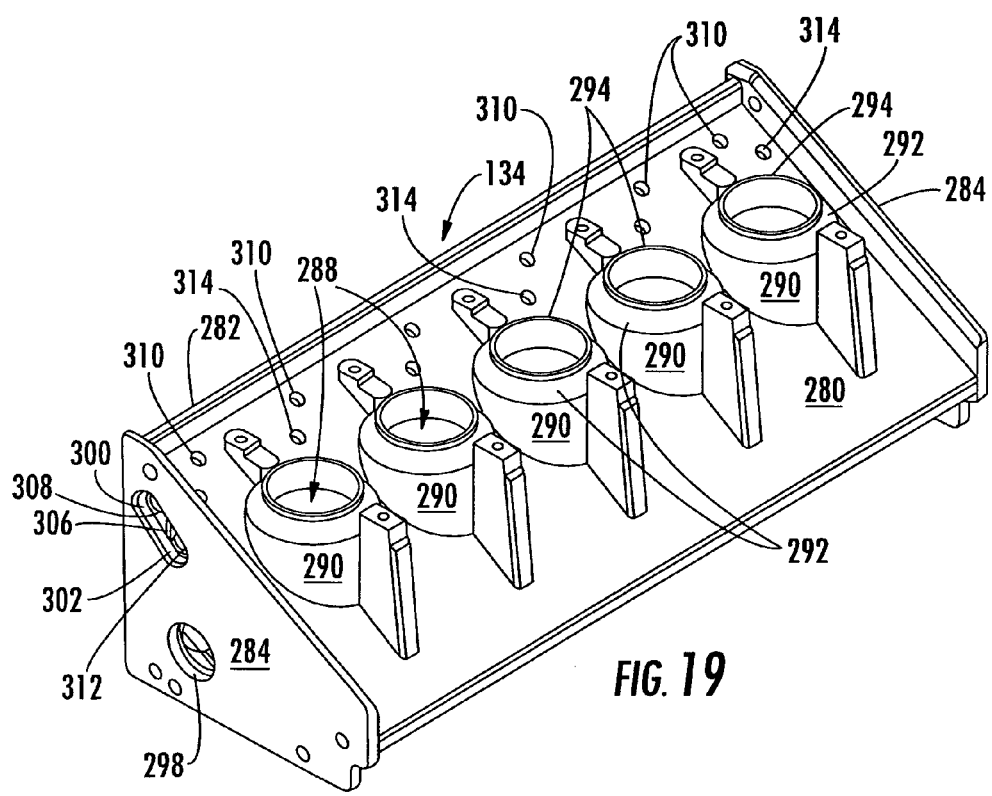
FIG. 19 is a perspective view of the integrated cup bridge and juice manifold and showing juice outlets positioned at the side, and fluid outlets formed on the top of the cup bridge for receiving pressure-actuated spray nozzles of the present invention.
Figure 20:
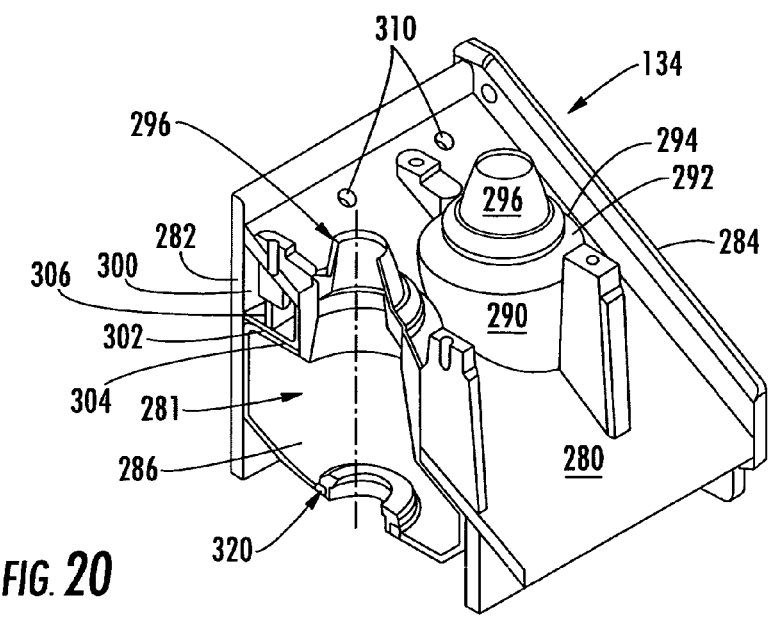
FIG. 20 is a fragmentary, perspective view of the integrated cup bridge and juice manifold shown in FIG. 19, including a strainer tube support cone mounted to aid in supporting strainer tubes.
Figure 21:
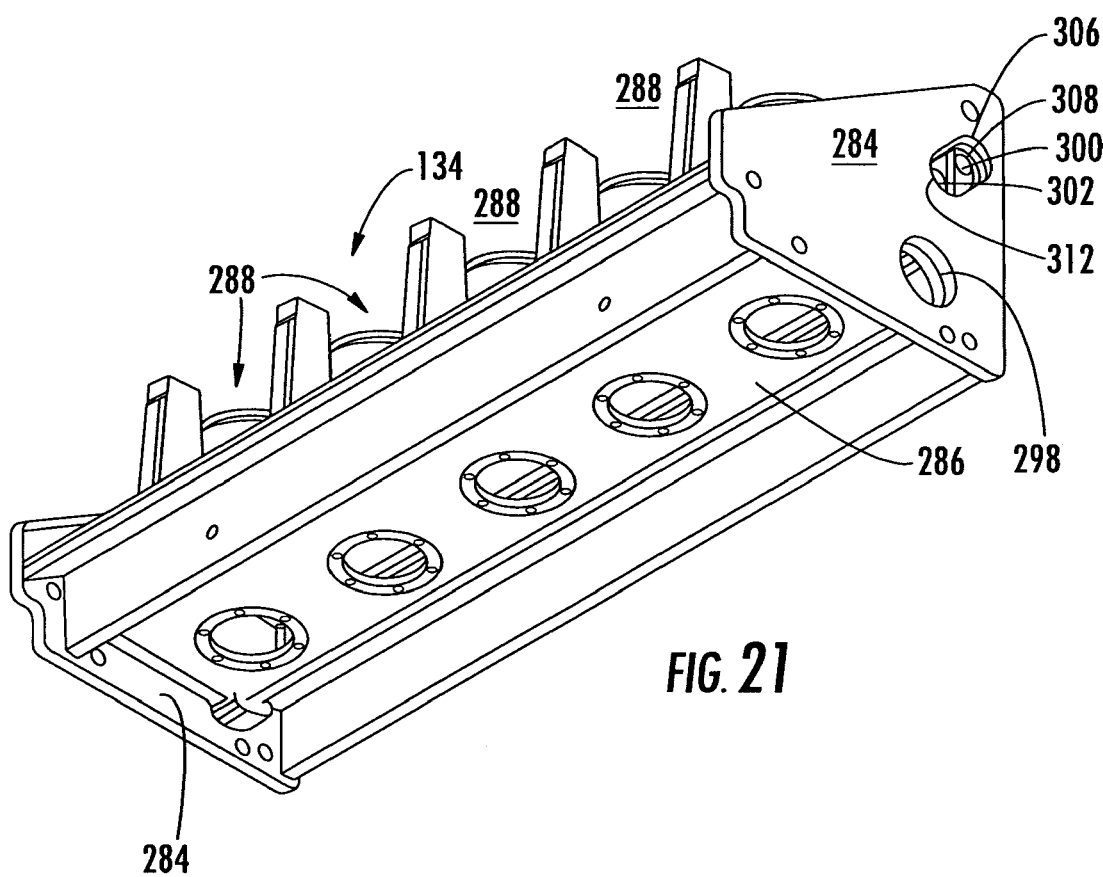
FIG. 21 is a bottom perspective view of the integrated cup bridge and juice manifold of FIG. 19.
Figure 22:
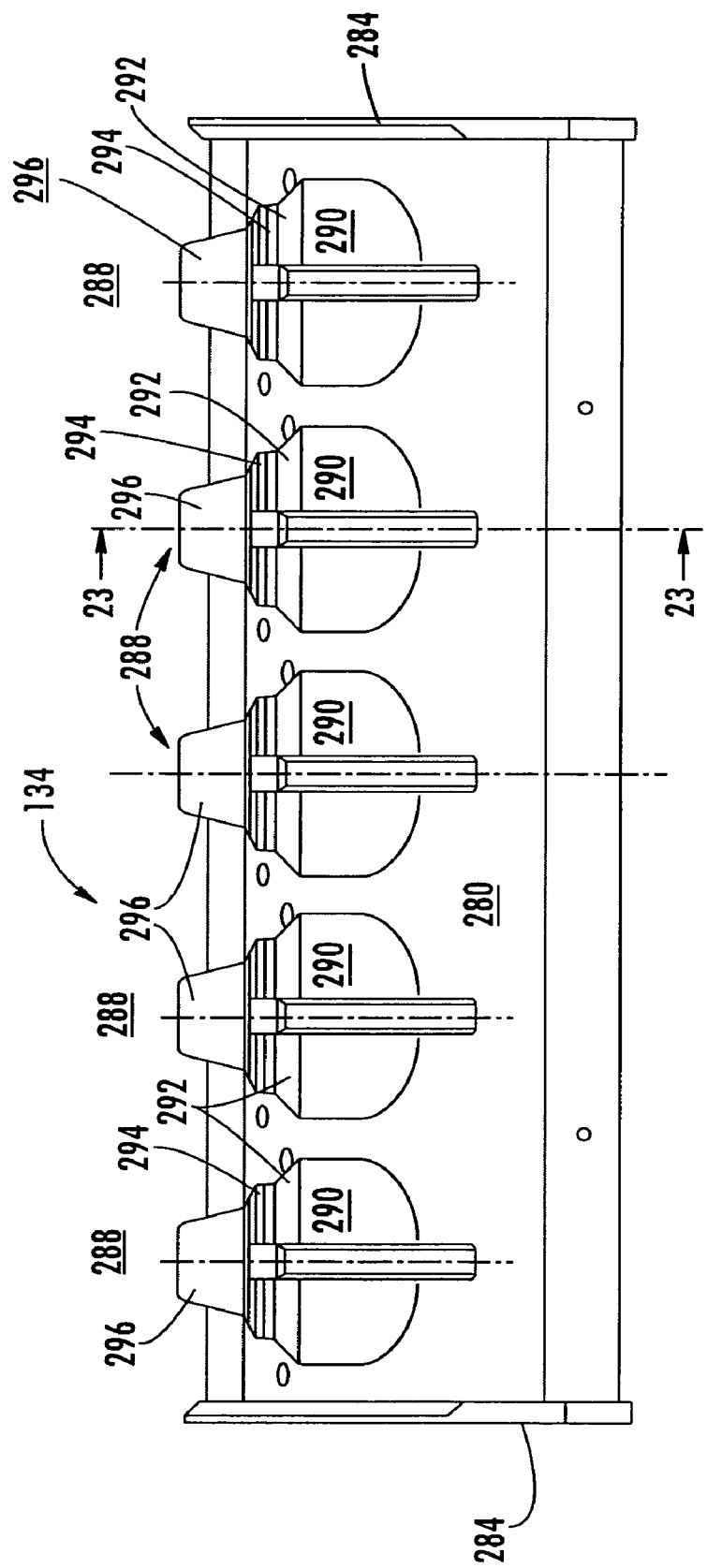
FIG. 22 is a front elevation view of the integrated cup bridge and juice manifold shown in FIG. 19, but with the added strainer tube support cones.
Figure 23:
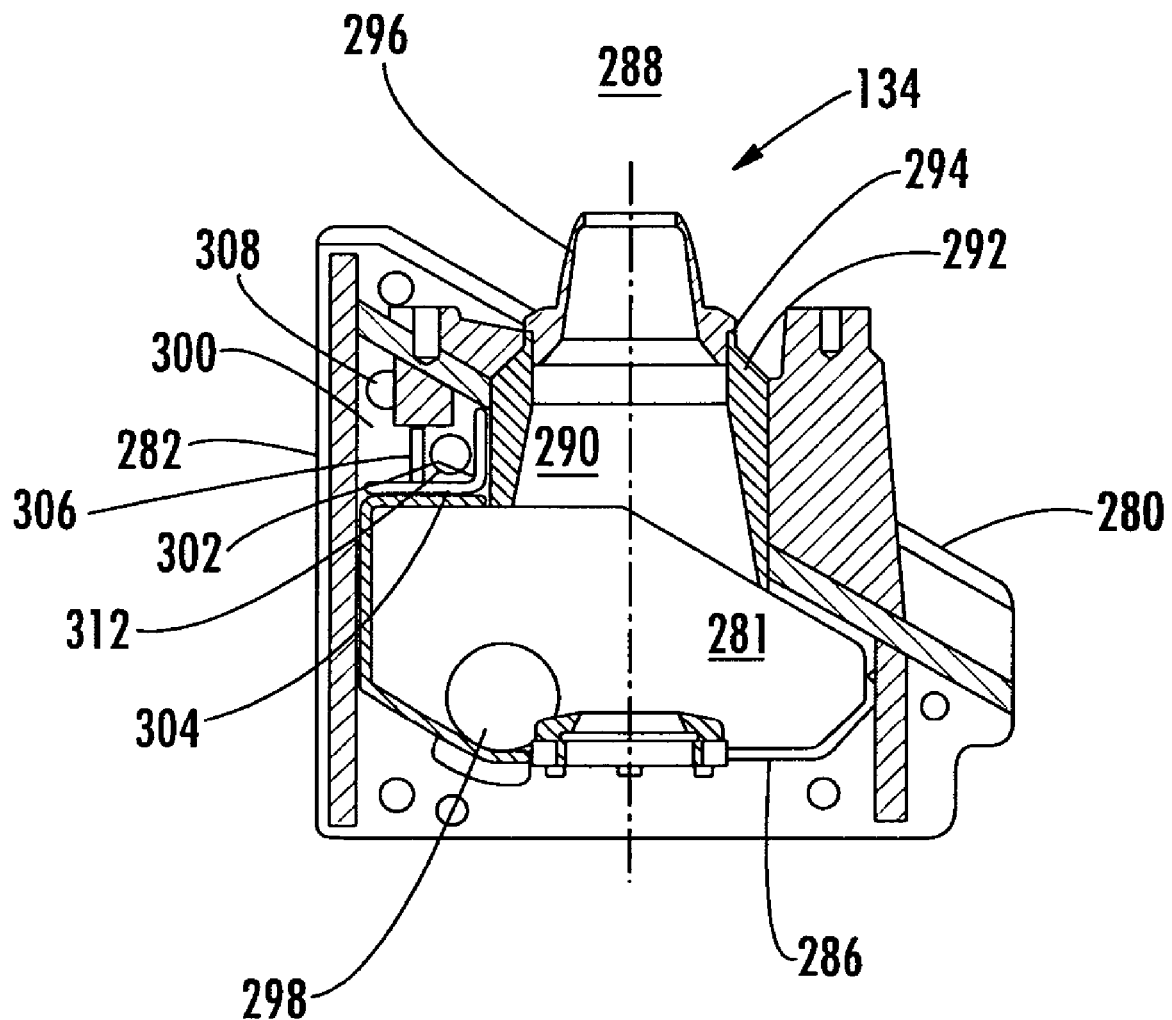
FIG. 23 is a sectional view taken along line 23-23 of FIG. 22.

It should be understood, however, that the cleaning fluid and the oil recovery fluid can be switched to the other respective conduit. At each fluid outlet 310, 314, a pressure-actuated spray nozzle, formed as a pop-up spray nozzle, is positioned. This nozzle is explained later with reference to FIGS. 28-49. As illustrated in FIG. 19, a fluid outlet 310, 314 is positioned adjacent each of the fixed extractor cup positions 288. In the illustrated embodiment, there are five fixed extractor cup positions 288, and six fluid outlets 310, 314 for each of the first and second fluid outlets for allowing adequate fluid spray during recovery or cleaning. At each fixed extractor cup position 288, opposed extractor cup fastener supports 320 are secured and permit the fixed extractor cups to be mounted and secured on the cup bridge by appropriate fasteners, as shown in FIG. 24.

Figure 24:
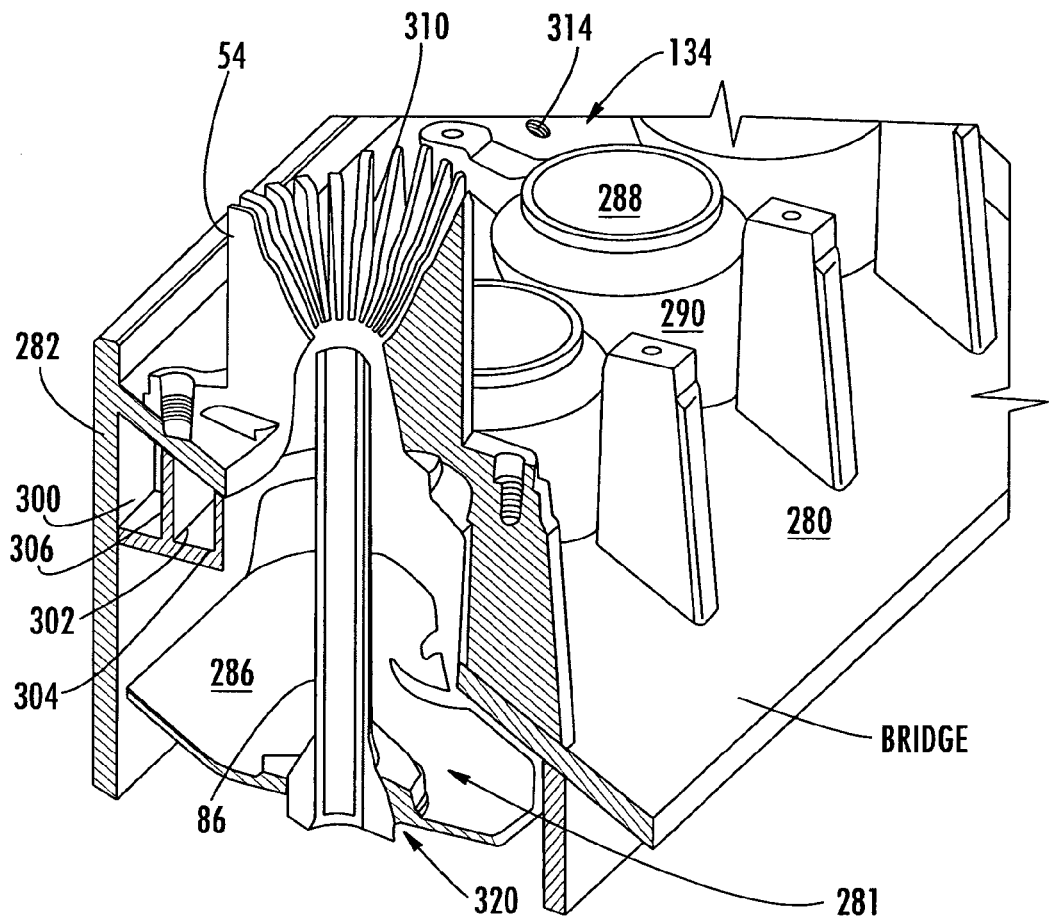
FIG. 24 is a fragmentary, perspective view of the integrated cup bridge and juice manifold of the present invention and showing the bottom loaded strainer tube and sealing assembly for sealing the strainer tube to the juice manifold.
Figure 25:
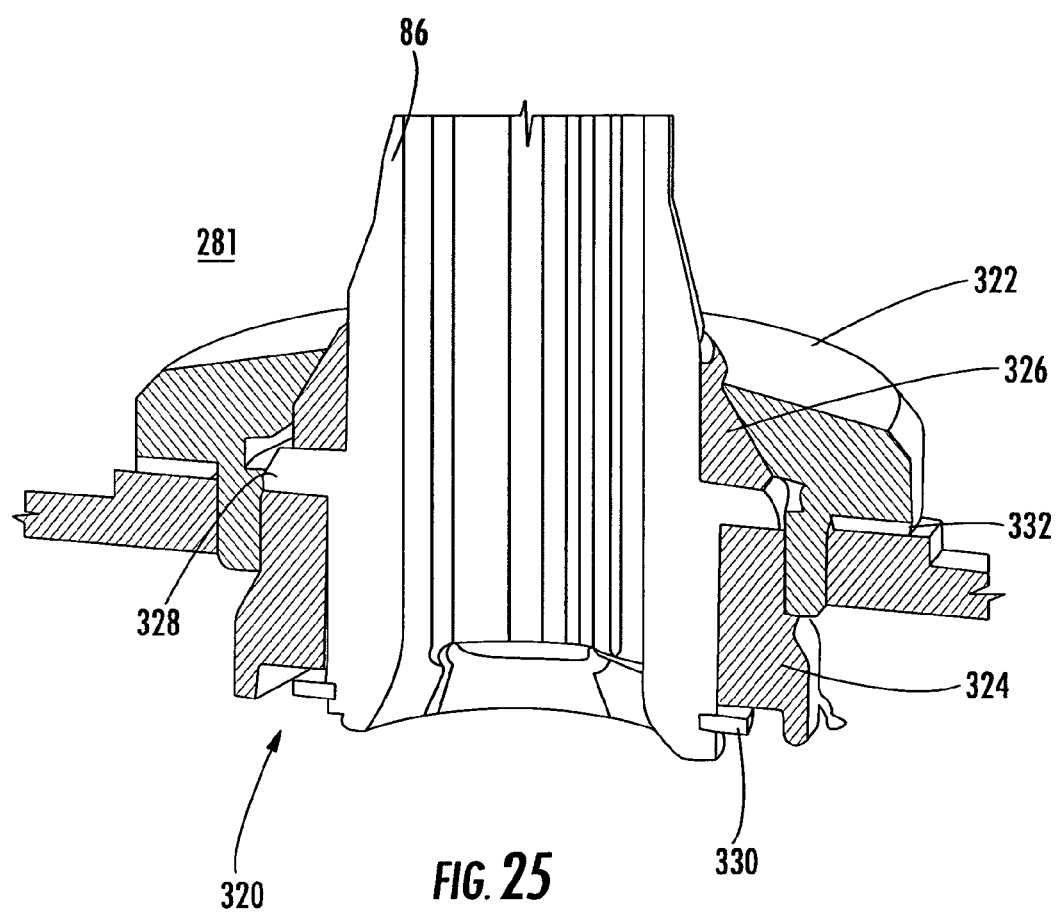
FIG. 25 is an enlarged, sectional view of the lower end of the strainer tube shown in FIG. 24 and showing greater details of the sealing assembly between the strainer tube and juice manifold.

As illustrated in FIGS. 24 and 25, the strainer tube 86 mounts through the bottom of the juice manifold 281. A sealing assembly 320 seals the strainer tube 86 relative to the juice manifold 281. In the illustrated and non-limiting embodiment shown in FIGS. 24 and 25, the sealing assembly 220 includes a threaded collar 322 positioned on an inside surface of the juice manifold through which the strainer tube 86 is received. A threaded insert 324 is received over an end of the strainer tube and received within the threaded collar 322 on an outside surface of the juice manifold 281. A gasket 326 is positioned between the threaded collar 322 and strainer tube 86 and is compressed as the threaded insert 324 is tightened within the threaded collar 322. The gasket 326 and inside surface of the threaded collar 322 include a beveled surface. A shoulder 328 is also formed on the strainer tube in which the gasket 326 and threaded insert 324 engage. A snap ring 330 can be positioned at an end of the strainer tube and maintain the threaded insert 324 on the strainer tube. A ring gasket 332 is preferably positioned between the threaded collar 322 and an inside surface of the juice manifold 281 and is compressed as the threaded insert 324 tightened within the threaded collar 322.

It should be understood that the threaded collar 322 could potentially be part of the juice manifold. A beveled surface and an internal thread could be machined directly into the juice manifold, eliminating the need for a threaded collar. The threaded insert could potentially be part of the strainer tube and could be machined directly onto the surface of the strainer tube, eliminating the requirements for a threaded insert.

Figure 26:
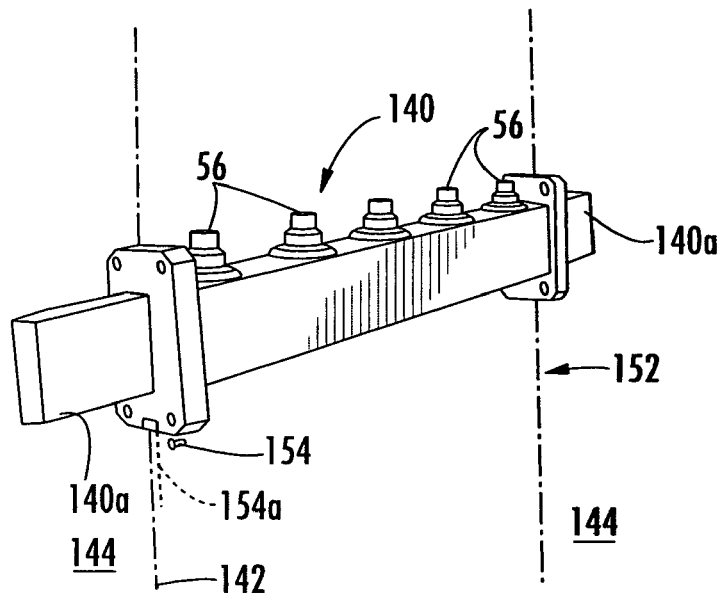
FIG. 26 is a perspective view of the orifice beam used in the present invention with ends adapted to extend through beam openings within inner side panels of the juice extractor.

Referring now to FIGS. 26 and 27, greater details of the orifice beam 140 (FIG. 26). The inner side panels 142, and position of components (FIG. 27) are illustrated. As explained before, the orifice beam 140 supports the orifice tubes 56. The orifice beam 140 includes ends 140*a* that extend through the window openings 152 to engage the drive mechanism positioned within the drive mechanism cavity 144 as explained before. The drive mechanism, in one preferred aspect of the present invention, is a pull-rod assembly that interconnects a cam follower and drive linkage 254, which includes a return spring mechanism in the upper part of the juice extractor 100, as shown in FIG. 27. A seal 154, as explained before, is formed at the juncture of orifice beam and the beam opening forming the window, as shown in FIGS. 7 and 27, to prevent product material from entering the drive mechanism cavity during juice extractor operation. This seal preferably comprises a labyrinth seal and includes a seal and seal strip member 154*a* that is moveable within the seal. The seal could be a plastic seal and the seal strip members could be sheet metal pieces moveable within the seal. Other seals can be used as suggested by those skilled in the art.

FIG. 27 also illustrates how at least one tapered spray nozzle, and preferably a plurality of tapered spray nozzles, are mounted flush on a wall surface, and preferably on the inner side panel at a fluid outlet for discharging fluid and cleaning product material during extractor operation. It is possible to place a nozzle in the drive mechanism cavity also. Each tapered spray nozzle is mounted flush on a wall surface. Fluid conduits 340 permit fluid flow to the nozzles, as shown in FIGS. 7 and 27. The configuration of a tapered spray nozzle of the present invention is explained below relative to FIGS. 46-54.

Referring now to FIGS. 28-45, details of a pressure-actuated spray nozzle 350 formed as a pop-up nozzle and positioned adjacent fixed extractor cups on the integrated cup bridge and juice manifold 134 are explained. The pressure-actuated spray nozzle 350 includes a tubular housing 352 and a nozzle body 354 received within the tubular housing and moveable between a retracted OFF position and an extended ON or spray position. A spring 356 is used for urging the nozzle body 354 toward the retracted OFF position and is shown in detail in FIGS. 30 and 32. The nozzle body includes a lower tubular member and upper spray directing member that are screwed together in one non-limiting example.

A flange 358 is connected to a lower end of the nozzle body to engage adjacent lower portions of the tubular housing 352 when in the extended spray position. A mushroom head 360 is connected to an upper end of the nozzle body 354 to engage adjacent upper portions of the tubular housing when in the retracted OFF position. The nozzle body 354 also includes a lower tubular member 362 and an upper spray directing member 364 connected thereto. This lower tubular member 362 is rotatably captured within the housing 352. The upper spray directing members 364 are rotatably settable with respect to the lower tubular member to permit adjustment of the spray direction. The tubular housing preferably is formed as an externally threaded tubular body and a flange 366 is connected to an upper end. The angled interior and exterior surfaces 368a, 368b prevent rotation, but allow axial movement and the "pop-up" function. The pressure-actuated spray nozzle 350 is typically screwed into a fluid outlet 310, 314 and a threadlock composition or other thread locking mechanism used to set the desired angle or position.

Referring now to FIGS. 46-54, details are illustrated of the tapered spray nozzle 370 that is mounted flush on a wall surface at a fluid outlet, such as a fluid outlet 372 on the inner side panels (FIG. 27). Naturally, the tapered spray nozzle can be positioned at other locations in the extractor. The tapered spray nozzle 370 is configured for preventing build-up on the spray nozzle of any product material during extractor operation. The term "tapered" as used for this nozzle encompasses many different configurations, including a spray nozzle that is conical, semi-hemispherical, rounded, or other shapes as suggested by those skilled in the art.

The tapered spray nozzle 370 includes a spray nozzle head 374 having at least one fluid spray orifice 376 and a spray disc 378 inserted within the fluid spray orifice. The spray disc 378 has a fluid outlet opening 380 configured for forming a predetermined fluid spray pattern of fluid used for cleaning. The opening 380 is preferably geometrically configured and can be rhomboid, curved, elliptical, circular or other shapes as suggested by those skilled in the art. In one aspect of the present invention, the spray nozzle head 374 and spray disc 378 are each rotatable for selecting a desired fluid spray direction. In another aspect of the present invention as shown in greater detail in FIG. 49, the spray nozzle head 374 includes at least two fluid spray orifices 376. A nozzle fastening body 382 is secured on the wall surface at a fluid outlet and receives the spray nozzle head 374. It includes a fluid channel 384 formed in the nozzle fastening body 382 and communicates with the fluid spray orifice 376 to the fluid outlet.

Figure 53:
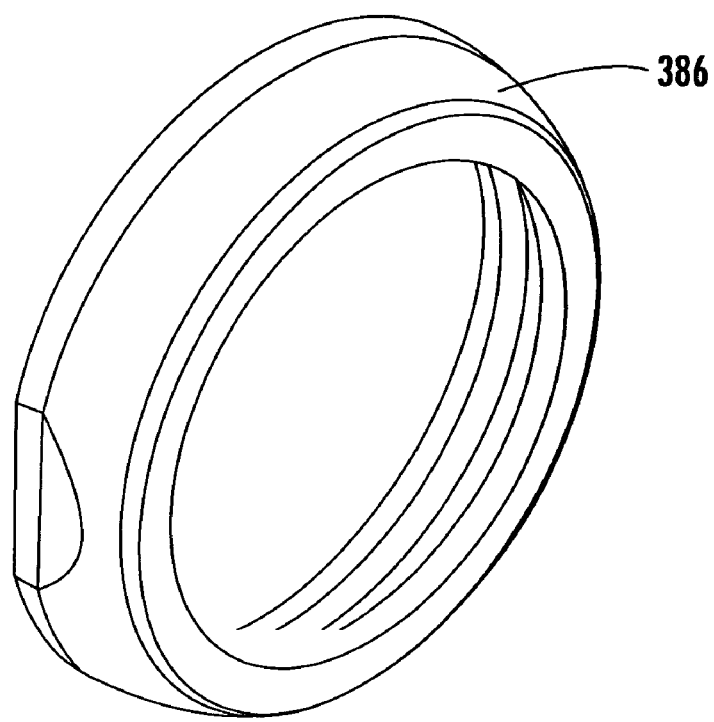
FIG. 53 is a perspective view of the nozzle retaining ring of the present invention shown in FIGS. 46 and 49 that secures the spray nozzle head to the nozzle fastening body.
Figure 54:
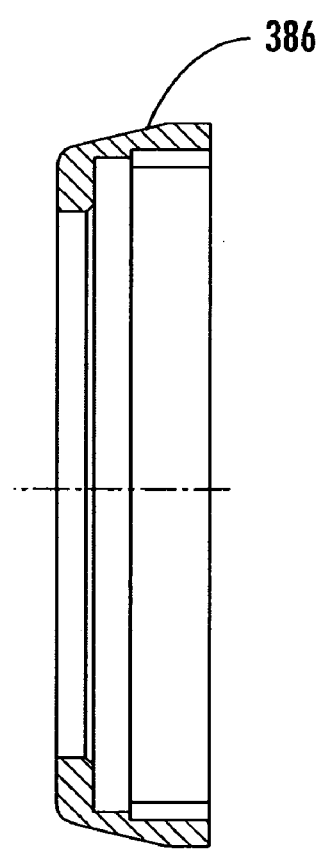
FIG. 54 is a sectional view of the nozzle retaining ring shown in FIG. 53.

The tapered spray nozzle 370 of the present invention is typically threaded within a fluid outlet and a threadlock composition or other thread locking mechanism used for tightening the spray nozzle relative to a desired water spray direction. The spray disc is also rotated to a desired location. The nozzle fastening body is threaded on an exterior surface and receives a nozzle retaining ring 386 having internal threads as shown in FIGS. 53 and 54 for retaining the nozzle head thereon when the nozzle retaining ring is secured.

This application is related to copending patent applications entitled, MULTI-LANE FRUIT GUIDE ASSEMBLY FOR A JUICE EXTRACTOR AND RELATED METHODS; MULTI-LANE FRUIT GUIDE ASSEMBLY HAVING INTEGRAL RIDGE ENDS FOR A JUICE EXTRACTOR AND RELATED METHODS; JUICE EXTRACTOR WITH COUNTERWEIGHT OPERATIVELY ENGAGED WITH CAMSHAFT; JUICE EXTRACTOR INCLUDING FRICTIONAL SHAFT-HUB COUPLINGS FOR DRIVE CAMS AND RELATED METHODS; JUICE EXTRACTOR WITH INTEGRAL JUICE MANIFOLD AND CUP BRIDGE; JUICE EXTRACTOR WITH BOTTOM LOADING STRAINER TUBE; JUICE EXTRACTOR WITH JUICE MANIFOLD HAVING SIDE OUTLET FOR JUICE; JUICE EXTRACTOR WITH ORIFICE TUBE BEAM DRIVE EXTENDING INTO SIDE PANELS; JUICE EXTRACTOR INCLUDING PRESSURE-ACTUATED NOZZLE AND ASSOCIATED METHODS; JUICE EXTRACTOR WITH TAPERED CLEAN UP NOZZLE; JUICE EXTRACTOR DESIGN; and JUICE EXTRACTOR INCLUDING FRUIT FEEDER DECOUPLING DETECTOR AND ASSOCIATED METHODS; which are filed on the same date and by the same assignee and inventors, the disclosures of which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A juice extractor comprising:
   an extractor frame having an interior and opposing side panels for dividing the interior into a product area and opposing drive mechanism cavities, each of the drive mechanism cavities is extended between one of the inner side panels and an outer cover of said extractor frame;
   at least one pair of extractor cups being relatively movable for compressing fruit therebetween; and
   a drive mechanism engaging at least one of the extractor cups and driving the extractor cup into engagement with the other extractor cup of the pair, said drive mechanism comprising two drive cams for driving an extractor cup of the pair of extractor cups into engagement with said other extractor cup and two return cams that drive the pair of extractor cups out of engagement, the return cams are positioned between the drive cams.

2. A juice extractor according to claim 1, wherein said return cam comprises a mathematical conjugate of the drive cam.

3. A juice extractor according to claim 1, and further comprising a plurality of pairs of extractor cups that are ganged together.

4. A juice extractor according to claim 1, and further comprising a camshaft that supports both said drive cams and return cams.

5. A juice extractor according to claim 1, wherein said extractor cups are arranged in vertical opposed relationship forming upper and lower extractor cups.

6. A juice extractor according to claim 1, and further comprising a cam follower train operatively connected to said return cams for disengaging the extractor cup.

7. A juice extractor comprising:
- an extractor frame having an interior and opposing side panels for dividing the interior into a product area and opposing drive mechanism cavities, each of the drive mechanism cavities is extended between one of the inner side panels and an outer cover of said extractor frame;
- a plurality of extractor cups positioned within said extractor frame;
- a cup support member mounted for reciprocating movement within said extractor frame;
- said plurality of extractor cups supported by said cup support member;
- a camshaft mounted for rotation within said extractor frame;
- a drive mechanism connected to said camshaft for rotating said camshaft; and
- two drive cams mounted on said camshaft and operatively connected to said cup support member to drive said cup support member and driving said extractor cups into engagement with a plurality of fixed extractor cups to compress fruit and two return cams mounted on the camshaft and operative for driving the extractor cups out of engagement from said fixed extractor cups, the return cams are positioned between the drive cams.

8. A juice extractor according to claim 7, and further comprising a bridge mounted within said extractor frame to support said fixed extractor cups.

9. A juice extractor according to claim 8, and further comprising an integrated bridge and juice manifold that supports said fixed extractor cups.

10. A juice extractor according to claim 7, wherein said return cam comprises a mathematical conjugate of the drive cam.

11. A juice extractor according to claim 7, and further comprising a cam follower train that is operatively connected to said return cams and cup support member, which is reciprocated by said return cams.

12. A juice extractor according to claim 7, wherein said camshaft is mounted at an upper portion of said juice extractor.

13. A juice extractor according to claim 7, and further comprising a drive gear mounted to an end of said camshaft, said drive mechanism engaging said drive gear.

14. A juice extractor according to claim 13, and further comprising a gearbox in which said drive gear is mounted.

15. A juice extractor according to claim 7, and further comprising a strainer tube mounted to receive juice and pulp of fruit, an orifice tube movable within the strainer tube, and a drive mechanism engaging the orifice tube for reciprocating the orifice tube within the strainer tube, said drive mechanism including an orifice tube drive cam mounted on said camshaft, and a drive linkage engaging the orifice tube and orifice tube drive cam.

16. A method for forming a juice extractor, the juice extractor comprising an extractor frame having an interior and opposing side panels for dividing the interior into a product area and opposing drive mechanism cavities, each of the drive mechanism cavities is extended between one of the inner side panels and an outer cover of said extractor frame, and a drive mechanism that engages at least one pair of extractor cups for moving an extractor cup into engagement with the other extractor cup and compressing fruit therebetween, the method comprising:
- forming the drive mechanism as two drive cams for driving the extractor cup into engagement with the other extractor cup and two return cams for driving the extractor cup out of engagement from the other extractor cup, and positioning the return cams are positioned between the drive cams.

17. A method according to claim 16, which further comprises forming the return cam as a mathematical conjugate of the drive cam.

18. A method of operating a juice extractor, the juice extractor comprising a moveable extractor cup, a fixed extractor cup, two return cams positioned between two drive cams, and an extractor frame having an interior and opposing side panels for dividing the interior into a product area and opposing drive mechanism cavities, each of the drive mechanism cavities is extended between one of the inner side panels and an outer cover of said extractor frame, the method comprising:
- driving the moveable extractor cup into engagement with the fixed extractor cup using the drive cams for compressing fruit between the extractor cups; and
- driving the moveable extractor cup out of engagement from the fixed extractor cup using the return cams.

19. A method according to claim 18, which further comprises forming the return cam as a mathematical conjugate of the drive cam.

* * * * *